United States Patent
Suzuki

(10) Patent No.: US 12,188,426 B2
(45) Date of Patent: Jan. 7, 2025

(54) CONTROL DEVICE FOR INTERNAL COMBUSTION ENGINE

(71) Applicant: Hitachi Astemo, Ltd., Hitachinaka (JP)

(72) Inventor: Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/280,285

(22) PCT Filed: Jan. 25, 2022

(86) PCT No.: PCT/JP2022/002721
§ 371 (c)(1),
(2) Date: Sep. 5, 2023

(87) PCT Pub. No.: WO2022/224516
PCT Pub. Date: Oct. 27, 2022

(65) Prior Publication Data
US 2024/0068423 A1    Feb. 29, 2024

(30) Foreign Application Priority Data
Apr. 19, 2021 (JP) ................. 2021-070585

(51) Int. Cl.
*F02D 41/24* (2006.01)
*F02D 35/02* (2006.01)
(Continued)

(52) U.S. Cl.
CPC ....... *F02D 41/2451* (2013.01); *F02D 35/028* (2013.01); *F02D 41/0052* (2013.01);
(Continued)

(58) Field of Classification Search
CPC .............. F02D 41/2451; F02D 35/028; F02D 41/0052; F02D 41/009; F02D 41/1445; F02D 2041/1412; F02P 5/153; F02P 17/04
See application file for complete search history.

(56) References Cited

U.S. PATENT DOCUMENTS

2006/0157029 A1   7/2006 Suzuki et al.
2007/0227503 A1*  10/2007 Hitomi .................... F02P 5/151
                                                                    123/316
(Continued)

FOREIGN PATENT DOCUMENTS

JP    2006-200396 A    8/2006
JP    2007-127004 A    5/2007
(Continued)

OTHER PUBLICATIONS

International Search Report (PCT/ISA/210) issued in PCT Application No. PCT/JP2022/002721 dated Mar. 8, 2022 with English translation (6 pages).
(Continued)

Primary Examiner — Joseph J Dallo
(74) Attorney, Agent, or Firm — Crowell & Moring LLP

(57) ABSTRACT

A processor (B705, B706) of a control device for an internal combustion engine 1 operates a first combustion timing (MFB 50) or a first combustion period (IG 100_1) in a cylinder of the internal combustion engine 1 from a crank angle detected by a crank angle sensor 20. A processor (B702) operates a heat generation rate based on a first combustion timing or a first combustion period. A processor (B703) operates in-cylinder pressure and in-cylinder unburned gas temperature based on the heat generation rate. A processor (B704) operates a first combustion speed (laminar flow combustion speed SL1) based on the in-cylinder pressure and the in-cylinder unburned gas temperature. A (Continued)

processor (B707) learns a correspondence relationship between the first combustion speed and the first combustion timing or the first combustion period.

7 Claims, 19 Drawing Sheets

(51) Int. Cl.
    *F02D 41/00*     (2006.01)
    *F02D 41/14*     (2006.01)
    *F02P 5/153*     (2006.01)
    *F02P 17/04*     (2006.01)

(52) U.S. Cl.
    CPC ....... *F02D 41/009* (2013.01); *F02D 41/1445* (2013.01); *F02P 5/153* (2013.01); *F02P 17/04* (2013.01); *F02D 2041/1412* (2013.01)

(56) References Cited

U.S. PATENT DOCUMENTS

| | | | |
|---|---|---|---|
| 2015/0142294 A1 | 5/2015 | Hagari | |
| 2017/0234249 A1* | 8/2017 | Sakai | F02D 41/401 |
| | | | 123/295 |
| 2017/0292462 A1* | 10/2017 | Tsuda | F02D 41/1497 |
| 2017/0356377 A1 | 12/2017 | Nogawa et al. | |
| 2018/0087459 A1 | 3/2018 | Hagari et al. | |
| 2018/0135539 A1* | 5/2018 | Tsuda | F02D 19/024 |
| 2018/0171942 A1* | 6/2018 | Nakagawa | F02M 26/47 |
| 2018/0179968 A1* | 6/2018 | Shimizu | F02D 41/3047 |
| 2020/0003145 A1* | 1/2020 | Sugano | F02D 35/028 |

FOREIGN PATENT DOCUMENTS

| | | | | |
|---|---|---|---|---|
| JP | 2007-218152 A | 8/2007 | | |
| JP | 2008-121576 A | 5/2008 | | |
| JP | 2015-96700 A | 5/2015 | | |
| JP | 2016-17459 A | 2/2016 | | |
| JP | 2017-219005 A | 12/2017 | | |
| JP | 2018-53742 A | 4/2018 | | |
| WO | WO-2012105038 A1 * | 8/2012 | ........... | F02D 35/028 |
| WO | WO-2012127574 A1 * | 9/2012 | ........... | F02D 35/025 |
| WO | WO-2013054434 A1 * | 4/2013 | ............. | F02D 35/02 |
| WO | WO-2013183163 A1 * | 12/2013 | ........... | F02D 35/023 |
| WO | WO-2017098904 A1 * | 6/2017 | ............. | F02D 41/38 |

OTHER PUBLICATIONS

Japanese-language Written Opinion (PCT/ISA/237) issued in PCT Application No. PCT/JP2022/002721 dated Mar. 8, 2022 with English translation (7 pages).

* cited by examiner

FIG. 5

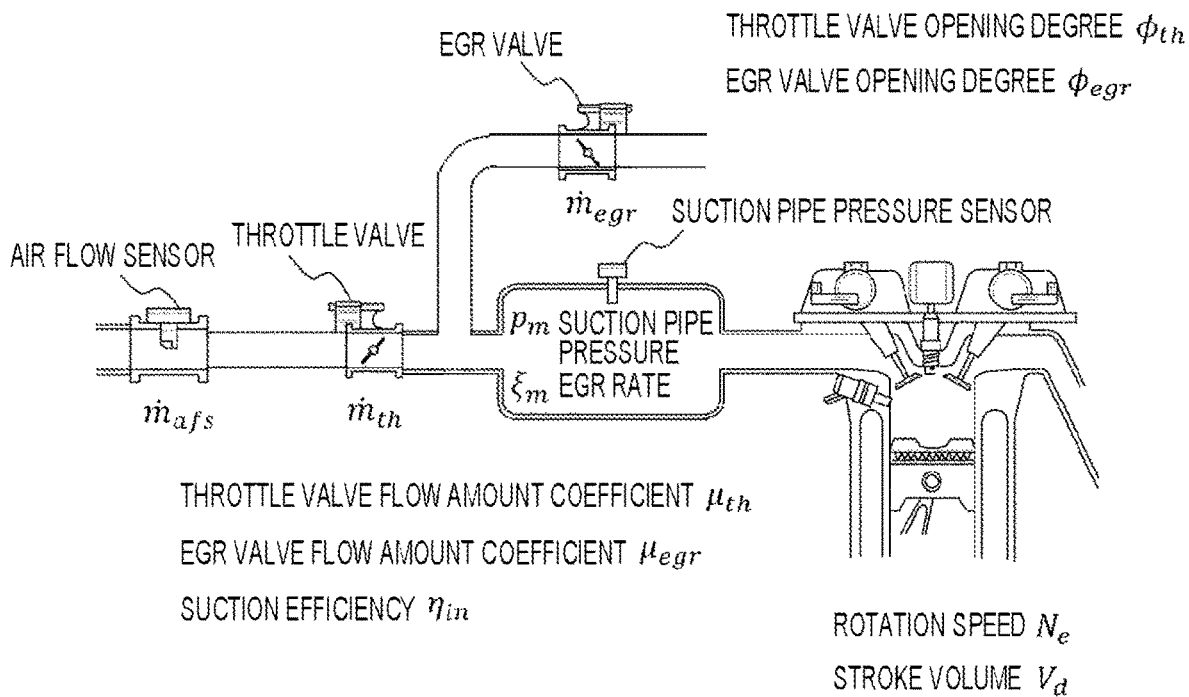

STATE EQUATION
$$\begin{cases} \dot{p}_m = \dfrac{\kappa R}{V_m}\left(T_a \dot{m}_{th} + T_{egr}\dot{m}_{egr} - T_m \dot{m}_{cyl}\right) \\ \dot{\xi}_m = \dfrac{RT_m}{p_m V_m}\left(\dot{m}_{egr} - \xi_m \dot{m}_{cyl}\right) \end{cases}$$

THROTTLE VALVE PASSAGE FLOW AMOUNT
$$\dot{m}_{th} = \sqrt{2\rho_a}\,\frac{\pi \mu_{th} D_{th}^2}{4}\left(1 - \frac{\cos(\phi_{th})}{\cos(\phi_{th0})}\right)\sqrt{p_a - p_m}$$

EGR VALVE PASSAGE FLOW AMOUNT
$$\dot{m}_{egr} = \sqrt{2\rho_e}\,\frac{\pi \mu_{egr} D_{egr}^2}{4}\left(1 - \frac{\cos(\phi_{egr})}{\cos(\phi_{egr0})}\right)\sqrt{p_e - p_m}$$

CYLINDER SUCTION FLOW AMOUNT
$$\dot{m}_{cyl} = \frac{N_e}{120}\eta_{in}\frac{V_d p_m}{RT_m}$$

CHARGING EFFICIENCY
$$\eta_{ch} = \eta_{in}\frac{p_m T_0}{p_0 T_m}(1-\xi_m)$$

NET MEAN EFFECTIVE PRESSURE
$$p_{me} = \frac{H_L \eta_{in} \eta_{ite}}{RT_m}\frac{\varphi}{L_0}p_m(1-\xi_m) - p_f$$

FIG. 6

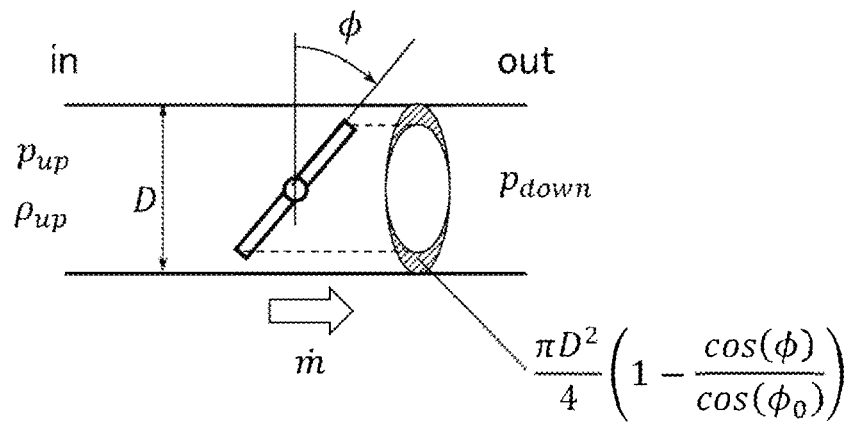

TARGET THROTTLE VALVE OPENING DEGREE OPERATION:

$\dot{m}_{th,d}$ : TARGET AIR FLOW AMOUNT $$\dot{m}_{th} = \sqrt{2\rho_{atm}} \frac{\pi \mu_{th} D_{th}^2}{4} \left(1 - \frac{\cos(\phi_{th})}{\cos(\phi_{th0})}\right) \sqrt{p_{atm} - p_m}$$

$$\Rightarrow \left(1 - \frac{\cos(\phi_{th})}{\cos(\phi_{th0})}\right) = \frac{\dot{m}_{th,d}}{\sqrt{2\rho_a} \frac{\pi \mu_{th} D_{th}^2}{4} \sqrt{p_{atm} - p_m}} \Rightarrow \phi_{th}$$

TARGET EGR VALVE OPENING DEGREE OPERATION:

$\dot{m}_{egr,d}$ : TARGET EGR FLOW AMOUNT $$\dot{m}_{egr} = \sqrt{2\rho_{egr}} \frac{\pi \mu_{egr} D_{egr}^2}{4} \left(1 - \frac{\cos(\phi_{egr})}{\cos(\phi_{egr0})}\right) \sqrt{p_{egr} - p_m}$$

$$\Rightarrow \left(1 - \frac{\cos(\phi_{egr})}{\cos(\phi_{egr0})}\right) = \frac{\dot{m}_{egr,d}}{\sqrt{2\rho_{egr}} \frac{\pi \mu_{egr} D_{egr}^2}{4} \sqrt{p_{egr} - p_m}} \Rightarrow \phi_{egr}$$

FIG. 15

POLYNOMIAL EXPRESSION $$y = b_0 + b_1 x_1 + b_2 x_1^2 + b_3 x_2 + b_4 x_2^2 + b_5 x_3 + b_6 x_3^2 + b_7 x_4 + b_8 x_4^2 \\ + b_9 x_1 x_2 + b_{10} x_1 x_3 + b_{11} x_1 x_4 + b_{12} x_2 x_3 + b_{13} x_2 x_4$$

$$y(k) = \theta^T \varphi(k)$$

$$\varphi(k) = [1, x_1, x_1^2, x_2, x_2^2, x_3, x_3^2, x_4, x_4^2, x_1 x_2, x_1 x_3, x_1 x_4, x_2 x_3, x_2 x_4]^T$$

$$\theta = [b_0, b_1, b_2, b_3, b_4, b_5, b_6, b_7, b_8, b_9, b_{10}, b_{11}, b_{12}, b_{13}]^T$$

COMBUSTION PERIOD (IG50) LEARNING $y$ : IG50

$x_1$ : ROTATION SPEED $x_2$ : CHARGING EFFICIENCY $x_3$ : LAMINAR COMBUSTION SPEED (IGNITION TIMING TO MFB10)

$x_4$ : LAMINAR COMBUSTION SPEED (MFB10 TO MFB90)

FIG. 21
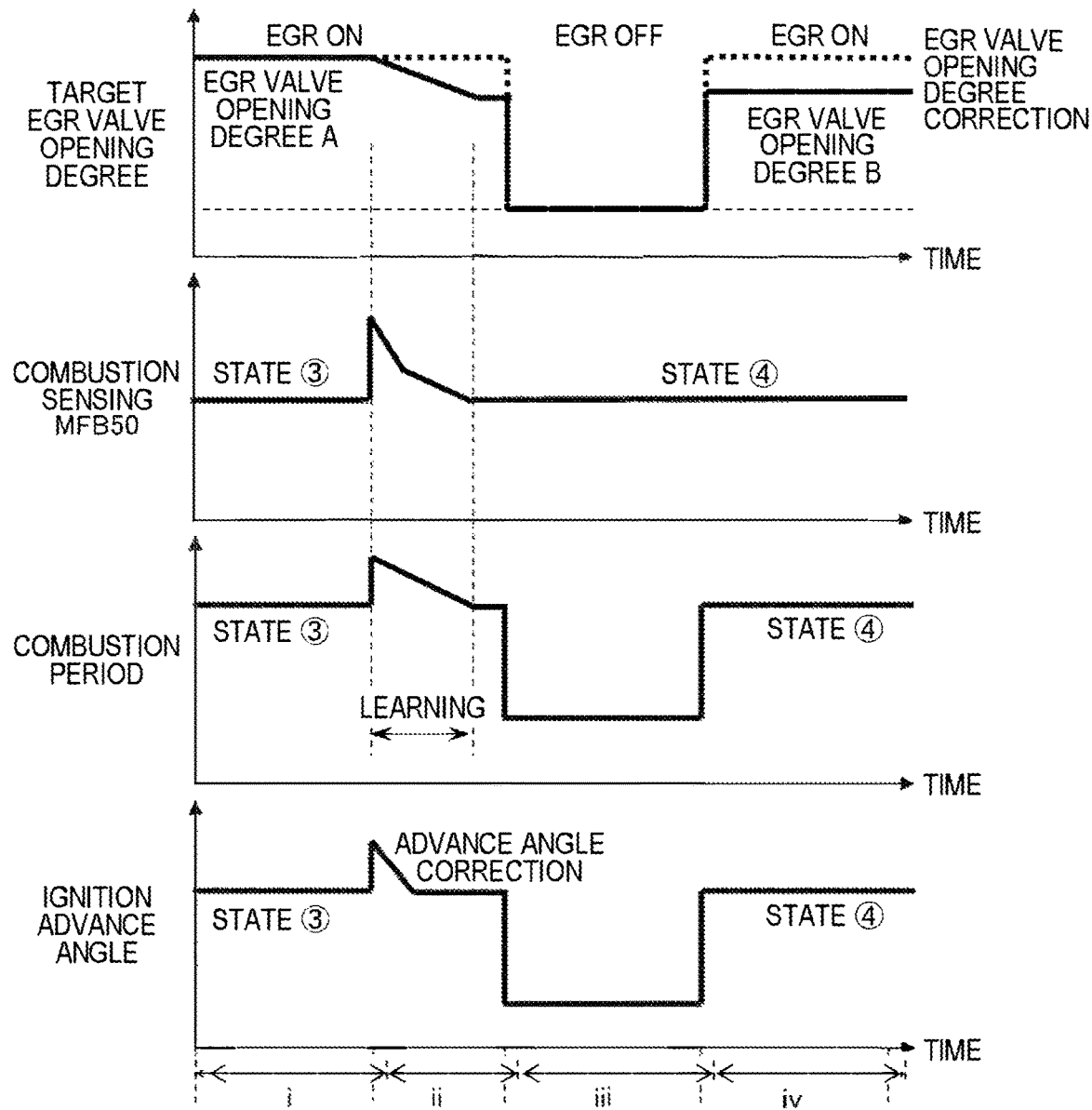
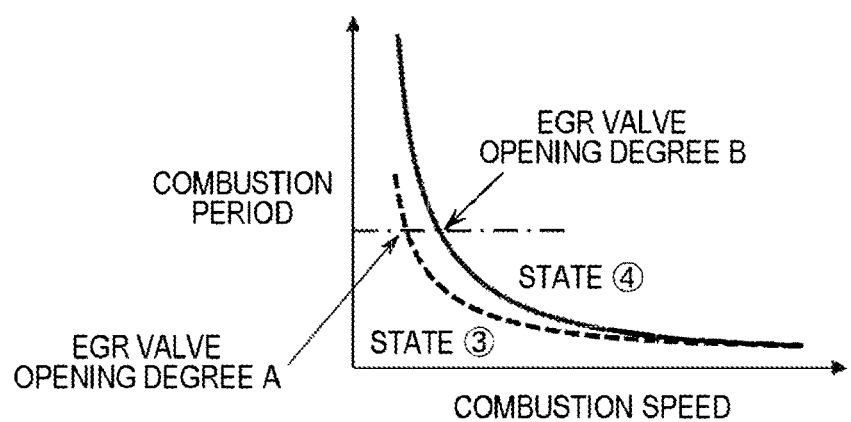

CONTROL DEVICE FOR INTERNAL COMBUSTION ENGINE

TECHNICAL FIELD

The present invention relates to a control device for an internal combustion engine.

BACKGROUND ART

Conventionally, there is known a combustion control technique for improving combustion performance of an internal combustion engine by returning (recirculating) a part of exhaust gas separated from an exhaust pipe of the internal combustion engine to an intake pipe. In this control technique, a system is realized in which a fuel injection amount and an ignition timing are controlled based on a relationship between an amount of fresh air detected by an intake air amount sensor and an exhaust gas recirculation ratio while controlling an amount of air sucked into an engine and a ratio of recirculating exhaust gas according to a valve opening degree. In addition, a lean-burn system that performs combustion with a lean fuel mixture with respect to a theoretical mixing ratio is known. In a lean-burn engine, a system is realized in which a fuel injection amount and an ignition timing are controlled based on a relationship between an amount of fresh air detected by an intake air amount sensor and a target air-fuel ratio while an amount of air taken into the engine is controlled according to a valve opening degree.

By increasing the exhaust gas recirculation rate (EGR rate), it is possible to increase effects such as reduction of a pump loss due to an influence of a throttle valve throttle at the time of a partial load operation and reduction of knocking at the time of a high load. On the other hand, when the EGR rate is excessively increased, problems such as unstable combustion and misfire occur. Also in the lean-burn engine, the pump loss due to the influence of the throttle valve throttle can be reduced during the partial load operation. In addition, the specific heat ratio increases due to the leaning and the temperature decrease accompanying the leaning, whereby the thermal efficiency can be improved. On the other hand, in an excessively lean condition, the problems of unstable combustion and misfire occur.

In the combustion control technology described above, combustion instability tends to become more significant as the exhaust gas recirculation amount is increased and diluted, or as the fuel injection amount is decreased and diluted, and combustion state detection feedback control becomes important as a technology for appropriately detecting and preventing excessive dilution and weakening. As means therefor, an in-cylinder pressure estimation technique using a crank angle sensor (see, for example, PTL 1) and a technique for detecting combustion instability by directly providing a pressure sensor in a cylinder and detecting the in-cylinder pressure are disclosed (see, for example, PTL 2).

CITATION LIST

Patent Literatures

PTL 1: JP 2018-53742 A
PTL 2: JP 2017-219005 A

SUMMARY OF INVENTION

Technical Problem

In the control system described in PTL 1, it is disclosed that torsional vibration torque generated in a crank mechanism is estimated based on information of a crank angle and angular acceleration based on a crank angle sensor, a combustion pressure in a cylinder derived from a dynamic relationship of the crank mechanism is operated based on the torsional vibration torque, and the operated combustion pressure is used for correction control of an ignition timing and an EGR rate. However, the method of calculating the cylinder combustion pressure from the crank angle sensor information using the dynamic relationship of the crank mechanism has a problem that the operation amount becomes large and the cost of the controller and the sensor increases since the crank angle sensor is required to have high accuracy.

On the other hand, in the control system described in PTL 2, a lean burn control system is disclosed which includes a sensor that directly measures the combustion pressure in the cylinder, detects the combustion speed state from the in-cylinder pressure measurement result in the initial combustion period immediately after the ignition timing, and corrects and controls the air-fuel ratio based on the combustion speed state. However, an increase in cost due to mounting of the combustion pressure sensor has been a problem.

An object of the present invention is to provide a control device for an internal combustion engine capable of detecting a combustion state in a cylinder without using an in-cylinder sensor and reducing manufacturing cost.

Solution to Problem

In order to achieve the above object, a control device for an internal combustion engine includes a processor that operates a first combustion timing or a first combustion period in a cylinder of an internal combustion engine from a crank angle detected by a crank angle sensor, operates a heat generation rate based on the first combustion timing or the first combustion period, operates an in-cylinder pressure and an in-cylinder unburned gas temperature based on the heat generation rate, operates a first combustion speed based on the in-cylinder pressure and the in-cylinder unburned gas temperature, and learns a correspondence relationship between the first combustion speed and the first combustion timing or the first combustion period.

Advantageous Effects of Invention

According to the present invention, the combustion state in the cylinder can be detected without using an in-cylinder sensor, and the manufacturing cost can be reduced. Problems, configurations, and effects other than those described above will be clarified by the following description of embodiments.

BRIEF DESCRIPTION OF DRAWINGS

FIG. 5 is a diagram for illustrating a physical model to be considered when an opening degree control model of a throttle valve and an EGR valve that realize target charging efficiency and a target EGR rate is configured.

FIG. 6 is a diagram for illustrating a method of operating a target valve opening degree based on a valve passage flow amount operation model using a schematic valve cross-sectional view.

FIG. 15 is a diagram for illustrating a method of learning the relationship between the combustion speed and the combustion period.

FIG. 21 is a time chart for illustrating a behavior when combustion control using combustion detection information based on a crank angle sensor is executed in the EGR combustion system.

DESCRIPTION OF EMBODIMENTS

Figure 1:
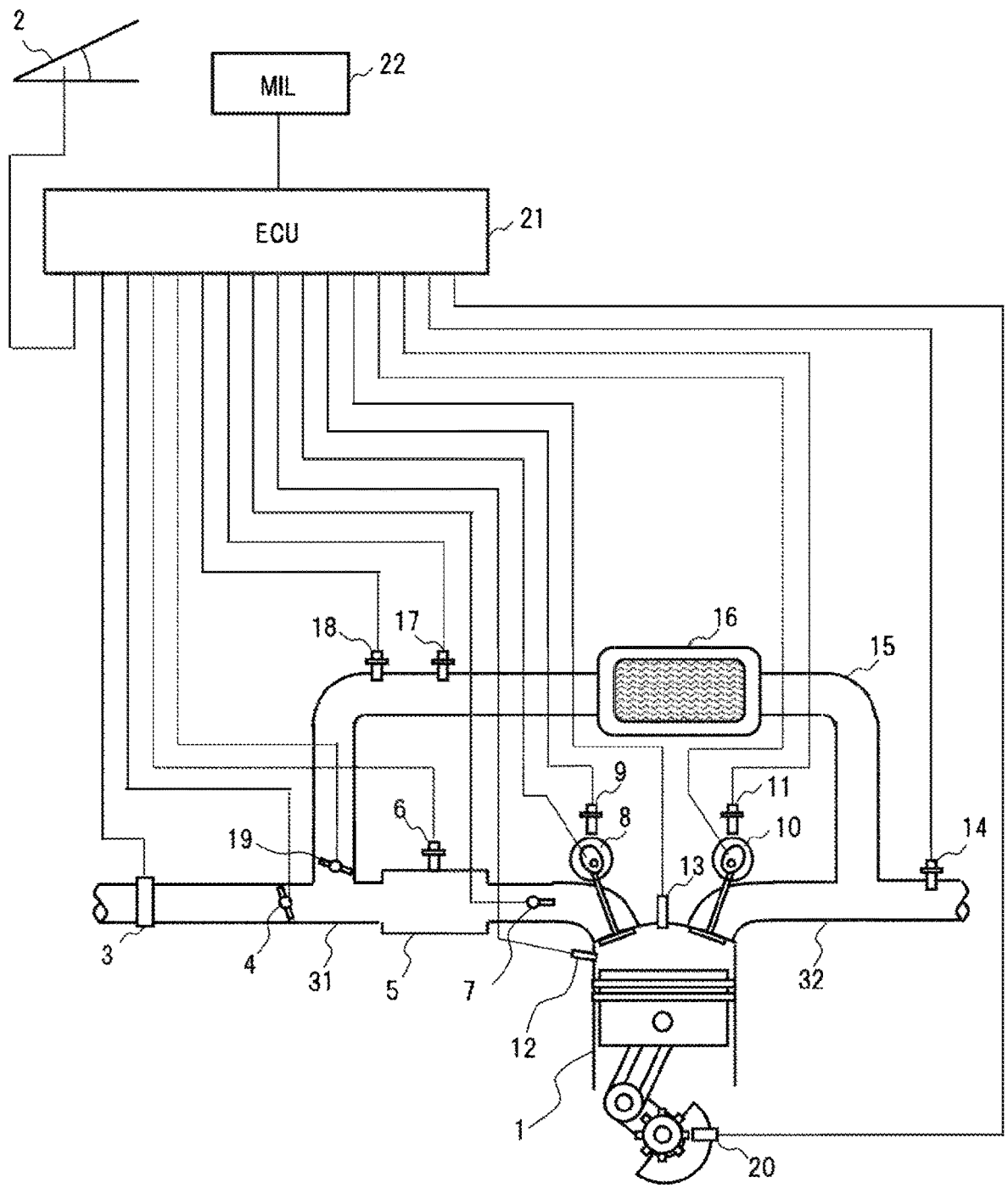
FIG. 1 is a schematic configuration diagram of an entire engine system to be controlled by an engine control system according to an embodiment of the present invention.

Hereinafter, examples of modes for carrying out the present invention will be described with reference to the accompanying drawings. An object of the present embodiment is to keep EGR control accuracy and an air-fuel ratio high, and to prevent combustion failure of an internal combustion engine due to these control errors. Note that components having substantially the same function or configuration in the present specification and the accompanying drawings are denoted by the same reference numerals, and redundant description will be omitted.

First, a configuration of an entire engine system to be controlled by an engine control system according to an embodiment of the present invention will be described with reference to FIG. 1.

FIG. 1 illustrates a schematic configuration example of an entire engine system to be controlled by an engine control system according to an embodiment of the present invention. The engine system includes an internal combustion engine 1, an accelerator position sensor 2, an air flow sensor 3, a throttle valve 4, an intake manifold 5, a flow enhancing valve 7, an intake valve 8, an exhaust valve 10, a fuel injection valve 12, an ignition plug 13, and a crank angle sensor 20. The engine system further includes an air-fuel ratio sensor 14, an exhausted gas recirculation (EGR) pipe 15, an EGR cooler 16, an EGR temperature sensor 17, an EGR valve upstream pressure sensor 18, an EGR valve 19, and an electronic control unit (ECU) 21.

The throttle valve 4 is provided upstream of the intake manifold 5 formed in an intake pipe 31, and controls an intake air amount flowing into a cylinder of the internal combustion engine 1 by narrowing an intake flow path. In the present embodiment, the throttle valve 4 is configured by an electronically controlled butterfly valve capable of controlling the valve opening degree independently of the accelerator pedal depression amount by the driver. The intake manifold 5 to which an intake pipe pressure sensor 6 is assembled communicates with the downstream side of the throttle valve 4.

The flow enhancing valve 7 is disposed downstream of the intake manifold 5, and enhances the turbulence of the flow inside the cylinder by generating a drift in the intake air sucked into the cylinder. When the exhaust gas recirculation combustion that will be described later is performed, the flow enhancing valve 7 is closed to promote and stabilize the turbulent flow combustion.

The internal combustion engine 1 is provided with the intake valve 8 and the exhaust valve 10. Each of the intake valve 8 and the exhaust valve 10 has a variable valve mechanism for continuously changing a phase of valve opening and closing. An intake valve position sensor 9 and an exhaust valve position sensor 11 for detecting the opening and closing phase of the valve are respectively assembled to the variable valve mechanisms of the intake valve 8 and the exhaust valve 10. A cylinder of the internal combustion engine 1 includes the direct fuel injection valve 12 that directly injects fuel into the cylinder. The fuel injection valve 12 may be of a port injection type that injects fuel into the intake port.

In a cylinder of the internal combustion engine 1, the ignition plug 13 that exposes an electrode portion in the cylinder and ignites a combustible air-fuel mixture by a spark is assembled. The crank angle sensor 20 is assembled to the crankshaft, and outputs a signal corresponding to a rotation angle of the crankshaft to the ECU 21 as a signal indicating a rotation speed. The air-fuel ratio sensor 14 is provided in an exhaust pipe 32, and outputs a signal indicating the detected exhaust gas composition, that is, the air-fuel ratio, to the ECU 21.

In the present embodiment, an EGR system including the EGR pipe 15 and the EGR valve 19 disposed in the EGR pipe 15 is configured. The EGR pipe 15 communicates between the exhaust flow path (intake pipe 31) and the intake flow path (exhaust pipe 32), divides the exhaust gas from the exhaust flow path, and recirculates (recirculates) the exhaust gas to the downstream of the throttle valve 4. The EGR cooler 16 provided in the EGR pipe 15 cools the exhaust gas. The EGR valve 19 is provided downstream of the EGR cooler 16 and controls the flow amount of the exhaust gas. The EGR pipe 15 is provided with the EGR temperature sensor 17 that detects the temperature of the exhaust gas flowing upstream of the EGR valve 19 and the EGR valve upstream pressure sensor 18 that detects the pressure upstream of the EGR valve 19.

The ECU 21 is an example of an electronic control unit, and controls each component of the engine system and executes various data processing. The engine system and the ECU 21 configure an engine control system. The above-described various sensors and various actuators are communicably connected to the ECU 21. The ECU 21 controls operations of actuators such as the throttle valve 4, the fuel injection valve 12, the intake valve 8, the exhaust valve 10, and the EGR valve 19. In addition, the ECU 21 detects an operation state of the internal combustion engine 1 based on signals input from various sensors, and causes the ignition plug 13 to ignite at a timing determined according to the operation state. Further, when detecting abnormality or failure in the engine system including the internal combustion engine 1, the ECU 21 turns on the corresponding warning display lamp 22 (MIL).

Figure 2:
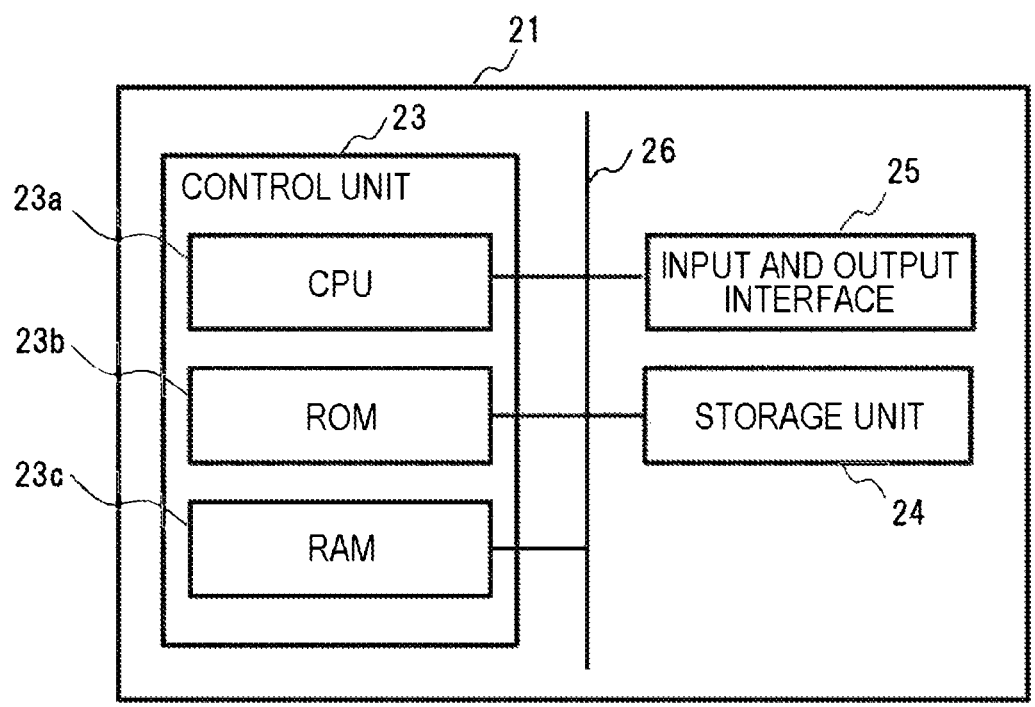
FIG. 2 is a block diagram illustrating a hardware configuration example of an ECU.

FIG. 2 is a block diagram illustrating a hardware configuration example of the ECU 21. The ECU 21 includes a control unit 23, a storage unit 24, and an input and output interface 25 connected to one another via a system bus 26. The control unit 23 includes a central processing unit (CPU) 23a, a read only memory (ROM) 23b, and a random access memory (RAM) 23c. The CPU 23a loads the control program stored in the ROM 23b into the RAM 23c and executes the program, thereby implementing the functions of the ECU 21. The storage unit 24 as an auxiliary storage device including a semiconductor memory or the like records a state space model, a parameter, data obtained by executing a control program, and the like. In addition, a control program may be stored in the storage unit 24.

The input and output interface 25 is an interface that communicates signals and data with each sensor and each actuator. The ECU 21 includes an analog/digital (A/D) converter (not illustrated) that processes input and output signals of each sensor, a driver circuit, and the like. The input and output interface 25 may also serve as an A/D converter. Although the CPU is used as the processor, another processor such as a micro processing unit (MPU) may be used.

Figure 3:
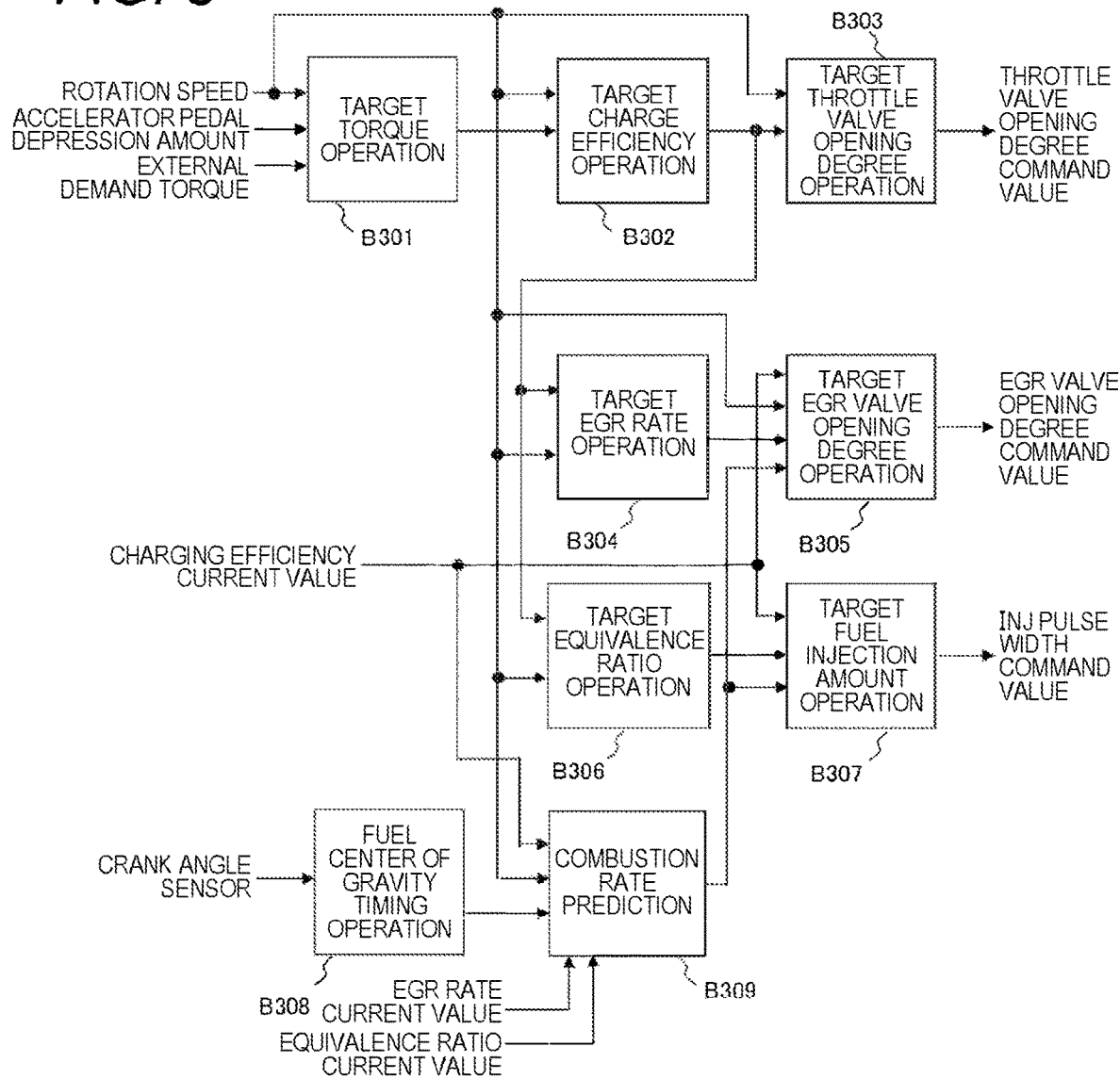
FIG. 3 is a diagram for illustrating a control block for operating a throttle valve opening degree command value, an EGR valve opening degree command value, and a fuel injection valve drive pulse command value.

FIG. 3 is a diagram for illustrating a control block for operating a throttle valve opening degree command value, an EGR valve opening degree command value, and a fuel injection valve drive pulse command value. In FIG. 3, B is added to the head of the reference numeral of each functional block (the same applies hereinafter).

A target torque operation unit 301 operates the target torque of the engine based on the rotation speed of the engine, the accelerator pedal depression amount of a driver, and the external required torque. A target charging efficiency operation unit 302 operates the charging efficiency, which is the amount of air sucked into the cylinder in one cycle, based on the rotation speed and the target torque. Here, the charging efficiency is a ratio of an amount of air actually taken in with an air mass when a stroke volume is filled with air in a standard state (25° C., 1 atm) as a reference 1.0.

A target throttle valve opening degree operation unit 303 operates the air flow amount passing through the throttle valve based on the target charging efficiency and the rotation speed, and operates the target throttle valve opening degree for realizing the air flow amount from the state before and after the throttle. A throttle valve opening degree command value is output based on the target throttle valve opening degree.

A target EGR rate operation unit 304 sets an EGR rate adjusted in advance by engine adaptation in consideration of fuel consumption and exhaust performance in the control map for each rotation speed and target charging efficiency, and operates the target EGR rate based on the rotation speed and the target charging efficiency with reference to the EGR rate. A target EGR valve opening degree operation unit 305 operates the target EGR valve opening degree based on the current charging efficiency value, the rotation speed, the target EGR rate, and a combustion speed prediction result to be described later. An EGR valve opening degree command value is output based on the target EGR valve opening degree. The present value of the charging efficiency will be described later in detail with reference to FIG. 4.

A target equivalence ratio operation unit 306 operates the target equivalence ratio based on the target charging efficiency and the rotation speed. Here, the equivalence ratio is an index of the fuel mixture concentration based on the theoretical air-fuel ratio, and is a numerical value larger than 1 in the rich condition and a numerical value less than 1 in the lean condition with the theoretical air-fuel ratio state as 1. A target fuel injection amount operation unit 307 operates the target fuel injection amount based on the current charging efficiency value, the target equivalence ratio, and a combustion speed prediction result to be described later. An injector drive pulse command value is output based on the fuel injection amount.

A fuel gravity center timing operation unit 308 operates a combustion gravity center timing (MFB 50: 50% mass fraction burned) based on the crank angle sensor signal. A combustion speed prediction unit 309 predicts the combustion speed based on the combustion centroid timing, the rotation speed, the present charging efficiency value, the present EGR rate value, and the present equivalence ratio value. The target EGR rate and the target fuel injection amount are corrected based on the combustion speed prediction result or the combustion period prediction result correlated with the combustion speed. The EGR rate current value will be described later in detail with reference to FIG. 4.

With such a control configuration, it is possible to accurately control the torque required by the driver, and it is possible to appropriately prevent combustion instability associated with an error in the EGR rate and the air-fuel ratio control to realize low fuel consumption and low exhaust performance.

Figure 4:
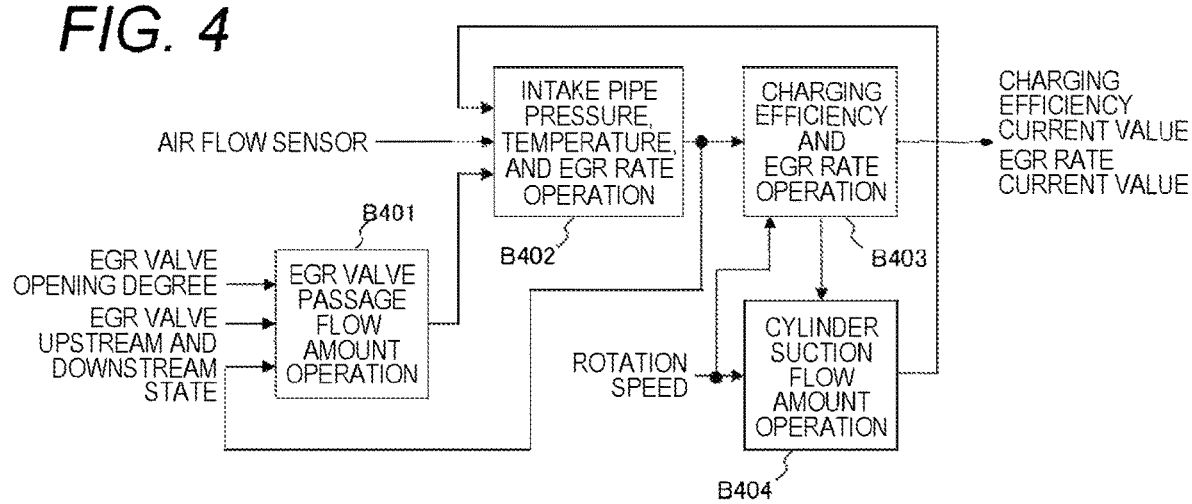
FIG. 4 is a diagram for illustrating an intake air measurement control block that operates a current charging efficiency value and a current EGR rate value.

FIG. 4 is a diagram for illustrating an intake air measurement control block that operates a current charging efficiency value and a current EGR rate value. An EGR valve passage flow amount operation unit 401 operates the EGR valve passage flow amount based on the EGR valve opening degree, the EGR valve upstream state, and the EGR valve downstream state. The EGR valve upstream state can be directly detected by a pressure sensor and a temperature sensor, or an operation value by a control map can be applied based on the rotation speed of the engine and load information. An intake pipe pressure, temperature, and EGR rate operation unit 402 operates the intake pipe pressure, temperature, and EGR rate based on the cylinder intake flow amount, the sensor value of the air flow sensor, and the EGR valve passage flow amount.

A charging efficiency and EGR rate operation unit 403 operates and outputs the current values of the charging efficiency and the EGR rate based on the pressure, the temperature, and the EGR rate of the intake pipe, and the rotation speed. A cylinder suction flow amount operation unit 404 operates the cylinder suction flow amount based on the rotation speed, the charging efficiency, and the EGR rate of the intake pipe, and the rotation speed. With such a control configuration, the current state in the cylinder can be accurately measured, the fuel injection amount and the ignition timing can be controlled with high accuracy, and low fuel consumption and low exhaust performance can be realized.

FIG. 5 is a diagram for illustrating a physical model to be considered when an opening degree control model of a throttle valve and an EGR valve that realize target charging efficiency and a target EGR rate is configured. As the state quantity in the intake pipe, the pressure (hereinafter, the pressure is referred to as "intake pipe pressure") pm in the intake pipe (for example, the intake manifold 5) and the EGR rate m in the intake pipe are defined, and can be obtained by Equations (1) and (2) below, respectively.

[Math. 1]
$$\dot{p}_m = \frac{\kappa R}{V_m}(T_a \dot{m}_{th} + T_{egr}\dot{m}_{egr} - T_m \dot{m}_{cyl}) \quad (1)$$

[Math. 2]
$$\dot{\xi}_m = \frac{RT_m}{p_m V_m}(\dot{m}_{egr} - \xi_m \dot{m}_{cyl}) \quad (2)$$

Here, mth with a superscript dot symbol is a throttle valve passage flow amount, megr with a superscript dot symbol is an EGR valve passage flow amount, mcyl with a superscript dot symbol is a cylinder suction flow amount, κ is a polytropic index, R is a gas constant, Vm is an intake manifold volume, Ta is atmospheric temperature, Tegr is an EGR temperature, and Tm is intake pipe temperature. The superscript dot symbol represents the first derivative with respect to time.

The throttle valve passage flow amount (mth with a superscript dot symbol) can be obtained by Equation (3) below. The throttle valve passage flow amount roughly corresponds to a detection value (mafs with a superscript dot symbol) of the air flow sensor 3.

[Math. 3]
$$\dot{m}_{th} = \sqrt{2\rho_a}\frac{\pi\mu_{th}D_{th}^2}{4}\left(1 - \frac{\cos(\phi_{th})}{\cos(\phi_{th0})}\right)\sqrt{p_a - p_m} \quad (3)$$

Here, ρa is an atmospheric density, μth is a throttle valve flow amount coefficient, Dth is an outer diameter of the throttle valve, φth is an opening degree of the throttle valve, φth0 is the minimum opening degree of the throttle valve, and pa is the atmospheric pressure.

The EGR valve passage flow amount (megr with a superscript dot symbol) can be obtained by Equation (4) below.

[Math. 4]
$$\dot{m}_{egr} = \sqrt{2\rho_e}\frac{\pi\mu_{egr}D_{egr}^2}{4}\left(1 - \frac{\cos(\phi_{egr})}{\cos(\phi_{egr0})}\right)\sqrt{p_e - p_m} \quad (4)$$

Here, ρe is an EGR density (recirculated exhaust gas density), μegr is an EGR valve flow amount coefficient, Degr is an EGR valve outer diameter, φegr is an EGR valve opening degree, and φegr0 is an EGR valve minimum opening degree.

The cylinder suction flow amount (mcyl with a superscript dot symbol) is obtained by Equation (5) below.

[Math. 5]
$$\dot{m}_{cyl} = \frac{N_e}{120}\eta_{in}\frac{V_d p_m}{RT_m} \quad (5)$$

Here, Ne is a rotation speed (the number of revolutions per minute) of the internal combustion engine 1, ηin is an intake efficiency, and Vd is a total stroke volume of the internal combustion engine 1. The intake efficiency is a value indicating a ratio of a mass of gas actually sucked into the cylinder with a mass of gas in the intake manifold corresponding to a stroke volume of all cylinders (for example, four cylinders) as a reference (1.0).

Charging efficiency ηch of fresh air sucked into the cylinder is defined by Equation (6) below.

[Math. 6]
$$\eta_{ch} = \eta_{in}\frac{p_m T_0}{p_0 T_m}(1 - \xi_m) \quad (6)$$

Here, p0 and T0 are temperature and pressure (for example, 25° C., 101.325 Pa) in a standard state of the atmosphere.

The net average effective pressure, which is an index of the torque, is obtained by Equation (7) below.

[Math. 7]
$$p_{me} = \frac{H_L \eta_{in}\eta_{ite}}{RT_m}\frac{\varphi}{L_0}p_m(1 - \xi_m) - p_f \quad (7)$$

Here, HL is a lower calorific value of the fuel, ηite is the illustrated thermal efficiency, φ is the equivalence ratio, L0 is the theoretical air-fuel ratio, and pf is friction average effective pressure regarding a friction torque. The friction torque is a torque that acts to inhibit motion between objects in contact by friction.

Here, the target valve opening degree operation based on the valve passage flow amount operation model will be described with reference to FIG. 6.

FIG. 6 is a diagram for illustrating a method of operating a target valve opening degree based on a valve passage flow amount operation model using a schematic valve cross-sectional view. In the drawing, m with a superscript dot is the valve passage flow amount, pup is the pressure of the gas on the upstream side (in) of the valve, pdown is the pressure of the gas on the downstream side (out) of the valve, ρup is the density of the gas on the upstream side of the valve, D is the outer diameter of the valve, and φ is the opening degree of the valve. The hatched portion represents a flow path of gas passing through the valve. The cross-sectional area of the flow path, that is, the opening area S is expressed by Equation (8) below.

[Math. 8]
$$S = \frac{\pi D^2}{4}\left(1 - \frac{\cos(\phi)}{\cos(\phi_0)}\right) \quad (8)$$

In a case where the valve is a throttle valve, pup in FIG. 6 corresponds to the atmospheric pressure patm, pdown corresponds to the intake pipe pressure pm, ρup corresponds to the atmospheric density patm, and D corresponds to the throttle valve outer diameter Dth. The throttle valve opening degree pth for realizing the target air amount (mth, d with a superscript dot) defined by the target torque and the rotation speed by modifying the throttle valve passage flow amount expression of Equation (3) is obtained by inversely calculating the throttle valve passage flow amount expression as in Equation (9) below.

[Math. 9]
$$\dot{m}_{th} = \sqrt{2\rho_{atm}}\,\frac{\pi\mu_{th}D_{th}^2}{4}\left(1 - \frac{\cos(\phi_{th})}{\cos(\phi_{th0})}\right)\sqrt{p_{atm} - p_m} \quad (9)$$
$$\Rightarrow \left(1 - \frac{\cos(\phi_{th})}{\cos(\phi_{th0})}\right) = \frac{\dot{m}_{th,d}}{\sqrt{2\rho_a}\,\frac{\pi\mu_{th}D_{th}^2}{4}\sqrt{p_{atm} - p_m}} \Rightarrow \phi_{th}$$

Equation (9) above can be replaced with table operation of the throttle valve opening degree and the opening area and used for operation of the target throttle valve opening degree by a target throttle valve opening degree operation unit 503 of FIG. 5.

Similarly, in a case where the valve is an EGR valve, the pup in FIG. 6 corresponds to the EGR valve upstream pressure pegr, the pdown corresponds to the intake pipe pressure pm, the ρup corresponds to the EGR density ρegr, and the D corresponds to the EGR valve outer diameter Degr. The EGR valve passage flow amount expression of Equation (4) is modified, and the EGR valve opening degree φegr for realizing the target EGR flow amount (megr, d with a superscript dot symbol) defined by the target torque and the rotation speed is obtained by inversely calculating the EGR valve passage flow amount expression as in Equation (10) below.

[Math. 10]
$$\dot{m}_{egr} = \sqrt{2\rho_{egr}}\,\frac{\pi\mu_{egr}D_{egr}^2}{4}\left(1 - \frac{\cos(\phi_{egr})}{\cos(\phi_{egr0})}\right)\sqrt{p_{egr} - p_m} \quad (10)$$
$$\Rightarrow \left(1 - \frac{\cos(\phi_{egr})}{\cos(\phi_{egr0})}\right) = \frac{\dot{m}_{egr,d}}{\sqrt{2\rho_{egr}}\,\frac{\pi\mu_{egr}D_{egr}^2}{4}\sqrt{p_{egr} - p_m}} \Rightarrow \phi_{egr}$$

Equation (10) above can be replaced with table operation of the EGR valve opening degree and the opening area, and can be used for operation of the target EGR valve opening degree by a target EGR rate operation unit 504 of FIG. 5.

Figure 7:
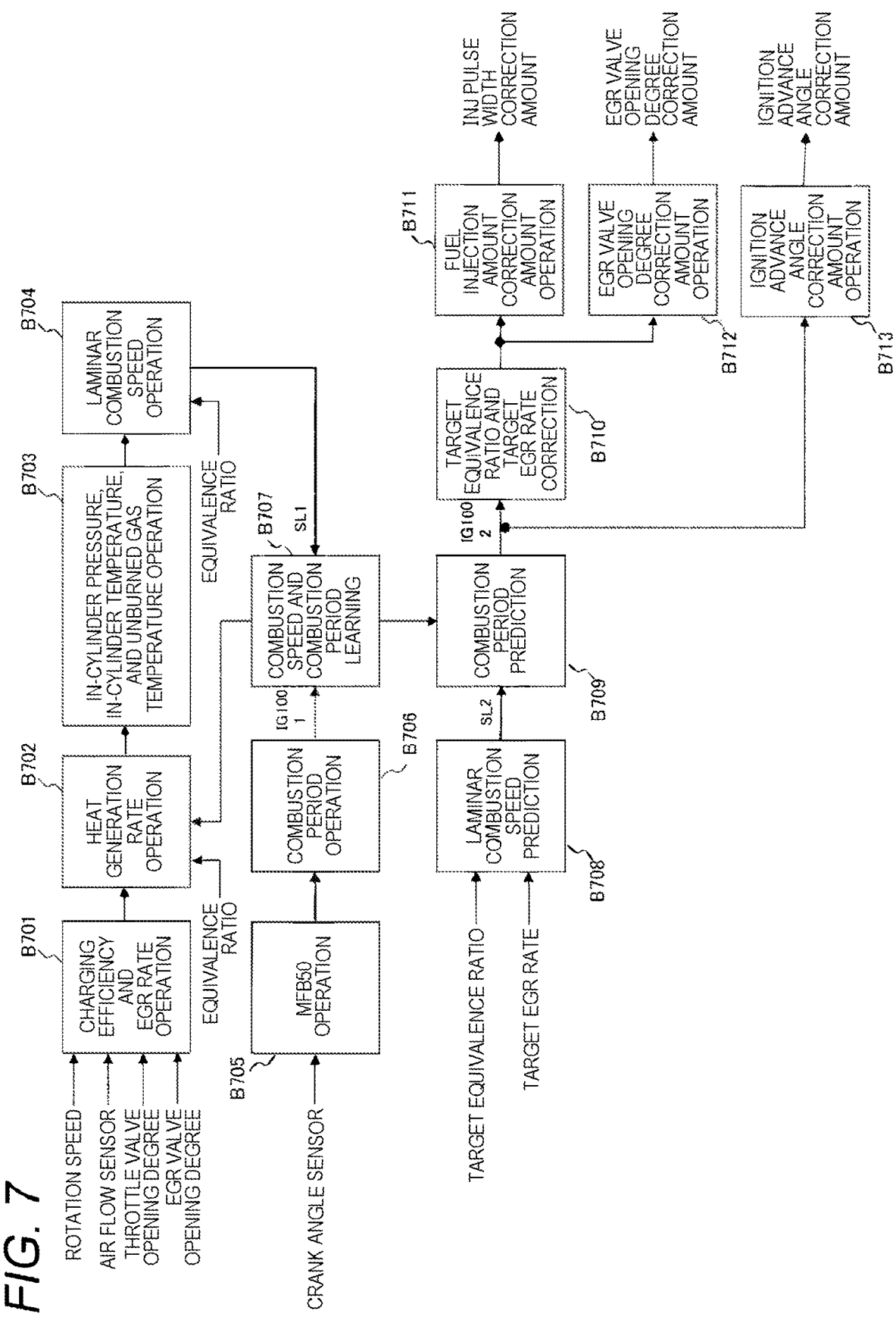
FIG. 7 is a diagram for illustrating an overall image of a control block for correcting a fuel injection amount and an EGR valve opening degree based on a combustion state detected based on a crank angle sensor.

FIG. 7 is a diagram for illustrating an overall image of a control block for correcting a fuel injection amount and an EGR valve opening degree based on a combustion state detected based on the crank angle sensor. A charging efficiency and EGR rate operation unit 701 operates the current charging efficiency and EGR rate based on the rotation speed, the sensor value of the air flow sensor, the throttle valve opening degree, and the EGR valve opening degree. The model calculated by the operation unit is described in detail in FIGS. 5 and 4.

A heat generation rate operation unit 702 operates the heat generation rate based on the current charging efficiency, the EGR rate, the equivalence ratio, and the combustion period to be described later. The heat generation rate is a calorific value generated for each crank angle in the total calorific value generated by combustion. The heat generation rate profile changes under the influence of a combustion speed, a combustion chamber shape, an ignition timing, and the like.

An in-cylinder pressure, in-cylinder temperature, and an unburned gas temperature operation unit 703 obtains the in-cylinder pressure, the in-cylinder temperature, and the unburned gas temperature from the state equation and the polytropic change relational expression from the relationship between the heat generation rate and the combustion chamber volume described above. A laminar flow combustion speed operation unit 704 operates the laminar flow combustion speed from the in-cylinder pressure, the unburned gas temperature, the equivalence ratio, and the EGR rate. The laminar flow combustion speed is a state quantity determined by a fuel type, an air-fuel mixture composition, a temperature, and a pressure.

An MFB 50 operation unit operates the MFB 50, which is the timing (combustion centroid timing) when the combustion mass ratio reaches 50% of the total supply mass, based on the crank angle sensor signal. A combustion period operation unit 706 operates the entire combustion period from the ignition timing to the combustion end timing based on the correlation with the MFB 50.

A combustion speed and combustion period learning unit 707 learns the relationship between the information on the combustion period obtained from the crank angle sensor signal (crank angle sensor information) and the laminar flow combustion speed based on the in-cylinder pressure estimation. A sequential least squares algorithm described later is applied to learning. Since it can be learned onboard by the successive least squares algorithm, the vehicle-specific correlation can be considered for the control. Examples of the cause of the state unique to the vehicle include variations in fuel properties, a change in a fuel type (for example, alcohol concentration in fuel), adhesion of an EGR valve or a throttle valve depot, an error in an actuator sensor, and the like.

In an EGR combustion system and a lean-burn system implemented in the vicinity of the combustion limit, since the above-described variation affects an excessive increase in the combustion period, it is necessary to appropriately consider the variation, and an adaptation mechanism to the variation is realized by detection by the crank angle sensor and on-board learning.

A laminar flow combustion speed prediction unit 708 predicts the laminar flow combustion speed in the target control state based on the target equivalence ratio, the target EGR rate, the current in-cylinder pressure, and the unburned gas temperature. A combustion period prediction unit 709 predicts the target equivalence ratio, the target EGR rate, the current in-cylinder pressure, and the combustion period with respect to the unburned gas temperature based on the laminar flow combustion speed prediction result and the correlation between the combustion speed and the combustion period.

A target equivalence ratio and target EGR rate correction unit 710 corrects the target equivalence ratio or the target EGR rate on the side where the combustion period decreases (the side where the combustion speed increases) in a case where the combustion period prediction value becomes equal to or greater than a predetermined value. That is, in the equivalence ratio, in a case where the combustion period is equal to or longer than the predetermined value, the correction to the rich side is performed. A fuel injection amount correction amount operation unit 711 corrects the fuel injection amount corresponding to the rich correction to the increase side, and adds the correction amount to an injector pulse width command value.

In addition, in the EGR rate, in a case where the combustion period is equal to or longer than a predetermined value, the target value is corrected to the side of reducing the EGR. An EGR valve opening degree correction amount operation unit 712 adds the EGR valve opening degree correction amount corresponding to the EGR reduction correction to the EGR valve opening degree command value. An ignition advance correction amount operation unit 713 corrects the ignition timing to the advance side in a case where the combustion period increases, and corrects the ignition timing to the retard side in a case where the combustion period decreases. The ignition timing is output as a command value. With such a control configuration, it is possible to appropriately prevent combustion instability associated with an error in the EGR rate and the air-fuel ratio control to realize low fuel consumption and low exhaust performance. In addition, since the combustion state detection feedback mechanism can be implemented without using the in-cylinder pressure sensor, the cost can be suppressed.

Figure 8:
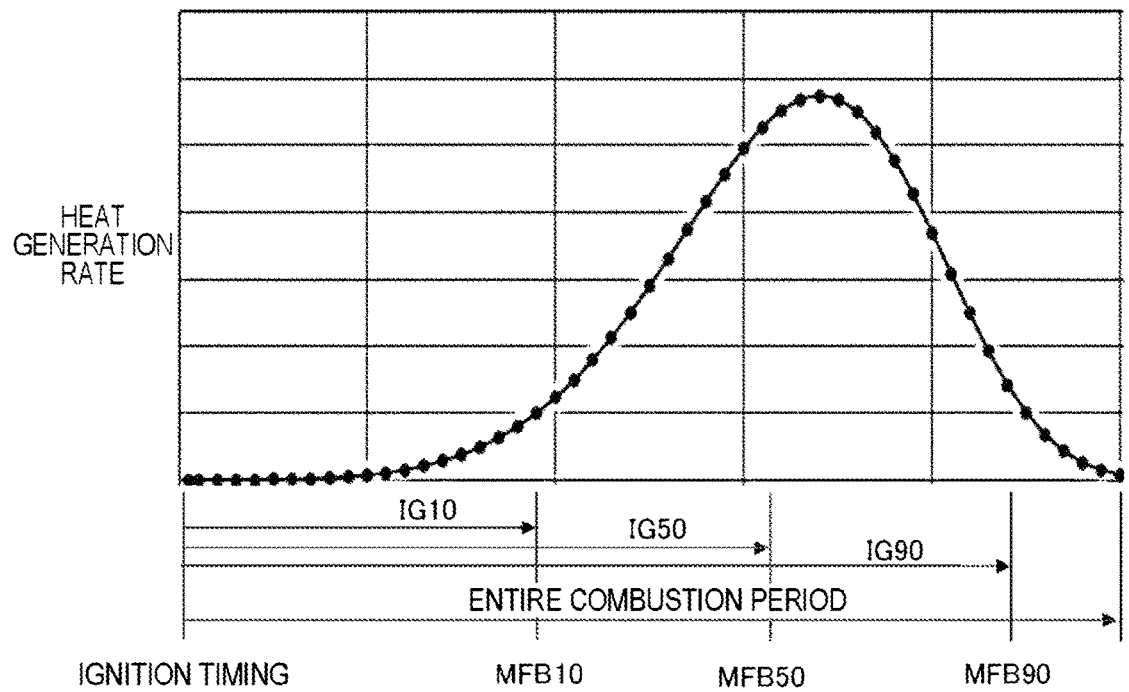
FIG. 8 is a diagram for illustrating a typical heat generation rate profile seen in an engine and typical combustion period and timing.

FIG. 8 is a diagram for illustrating a typical heat generation rate profile seen in an engine and typical combustion period and timing. Combustion in a gasoline engine is a flame nucleation period for a while after ignition, and generates little heat. Up to the 10% combustion mass ratio timing (MFB 10) is referred to as an initial combustion period. In addition, a period from the ignition timing to the MFB 10 is referred to as an IG 10. The period from the MFB 10 to the MFB 90 is referred to as a main combustion period in which combustion progresses by turbulent flame propagation and most of heat generation rate is shown. Here, the MFB 50 is defined as the timing of the combustion centroid, and the timing of the MFB 50 is detected based on the crank angle sensor signal.

Figure 9A:
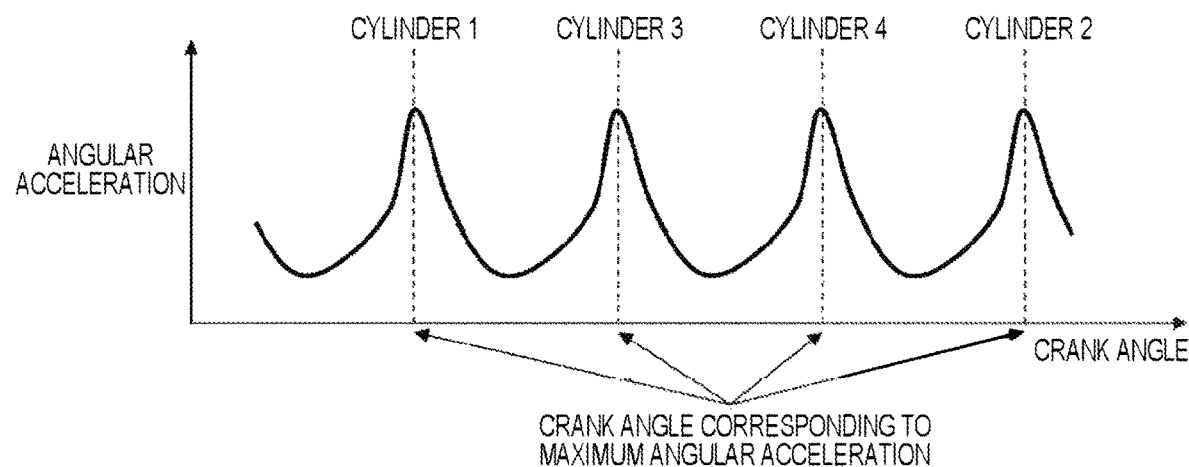
FIG. 9A is a view for illustrating a method of detecting an MFB 50 timing based on a crank angle sensor signal.
Figure 9B:
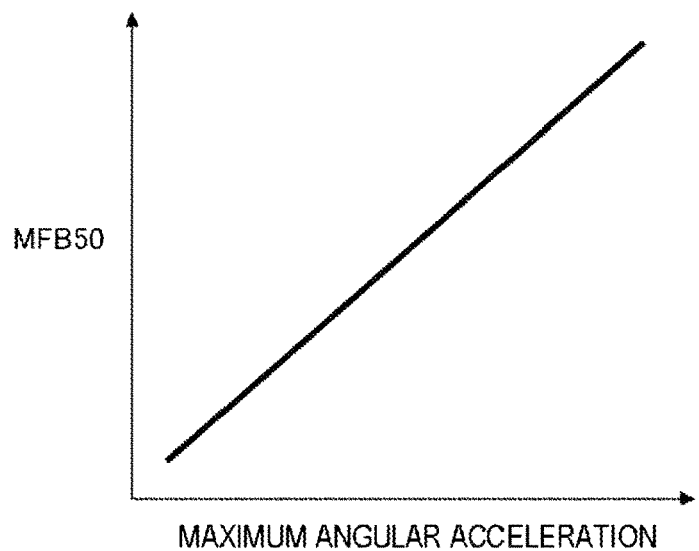
FIG. 9B is a diagram for illustrating a relationship between a maximum angular acceleration and an MFB 50.

FIGS. 9A and 9B are views for illustrating methods of detecting an MFB 50 timing based on a crank angle sensor signal. FIG. 9A illustrates a result of indicating the crank shaft angular acceleration obtained based on the crank angle sensor signal with respect to the crank angle. As can be seen from the drawing, the behavior in which the angular acceleration of the crankshaft shows a peak at the combustion timing of each cylinder is illustrated. The relationship between the maximum crank angular acceleration and the combustion centroid (MFB 50) of each cylinder is illustrated in the lower diagram. There is a high correlation in the relationship between the maximum crank angle acceleration (maximum angular acceleration) and the MFB 50, and the MFB 50 timing can be indirectly detected based on the crank angle sensor signal using this relationship. With such a control configuration, the operation load can be greatly reduced as compared with a method of estimating and calculating the in-cylinder pressure for each crank angle based on the torsional torque transition for each crank angle by the crank angle sensor signal. Further, the system of the embodiment of the present invention is configured to detect the MFB 50 which is the combustion centroid, but the present invention is not limited thereto, and the same or similar effect can be obtained by representatively detecting other combustion mass ratios.

Figure 10:
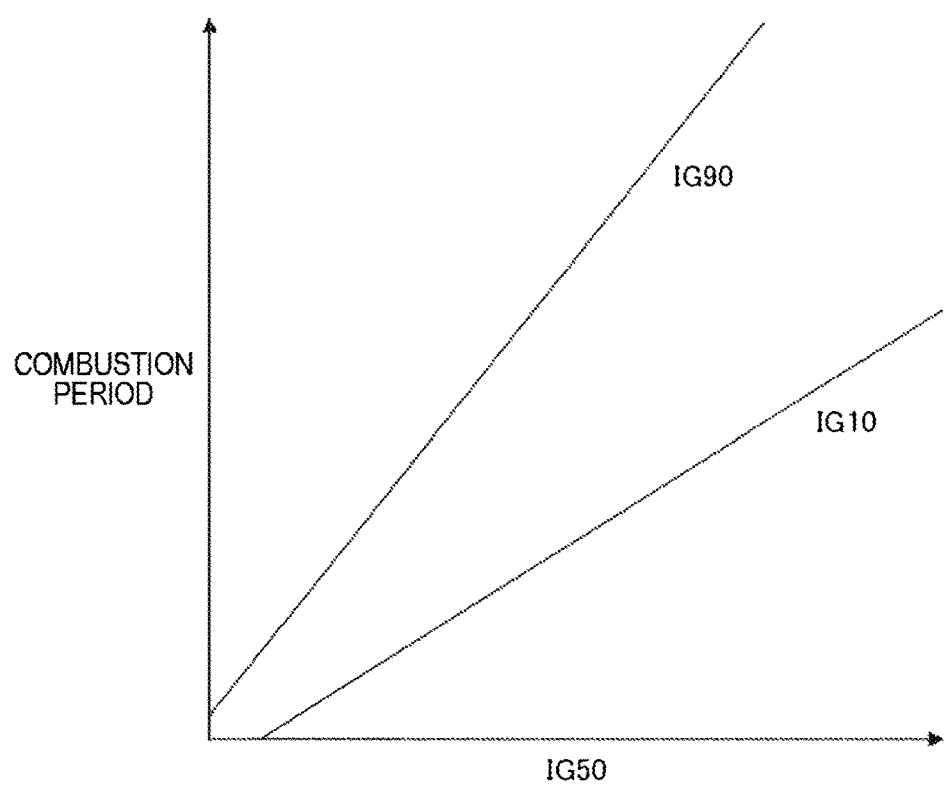
FIG. 10 is a diagram for illustrating a relationship between an IG 50, an IG 10, and an IG 90.

FIG. 10 is a diagram for illustrating a relationship between an IG 50, an IG 10, and an IG 90. The IG 50 is a combustion period from the ignition timing to the MFB 50, and the MFB 50 based on the crank angle sensor signal described above can be applied. As can be seen from the drawing, there is a high correlation in the relationship between the IG 50 and the IG 10 and the IG 90, and the IG 10 and the IG 90 can be indirectly detected from the IG 50 using this relationship.

Information on the initial combustion period can be acquired from the IG 10, information on the entire combustion period can be acquired from the IG 90, and information on the main combustion period can be acquired from the information on the MFB 10 to the MFB 90. In addition, in the system according to the embodiment of the present invention, the linear function of the IG 50, the IG 10, and the IG 90 is used, but the present invention is not limited thereto, and a similar or similar effect can be obtained by using a quadratic function or the like.

Figure 11A:
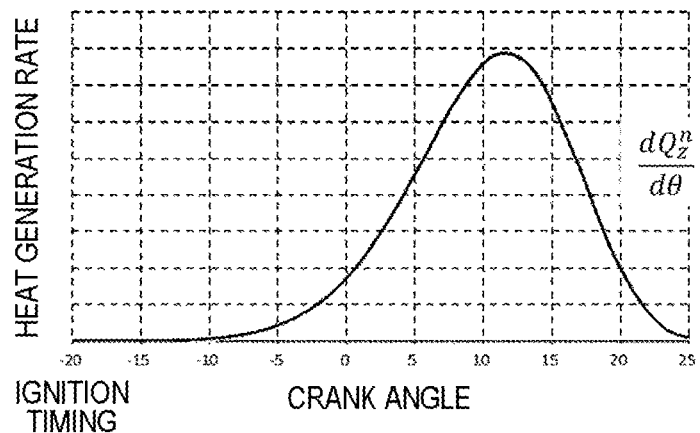
FIG. 11A is a diagram for illustrating a heat generation rate associated with combustion.
Figure 11B:
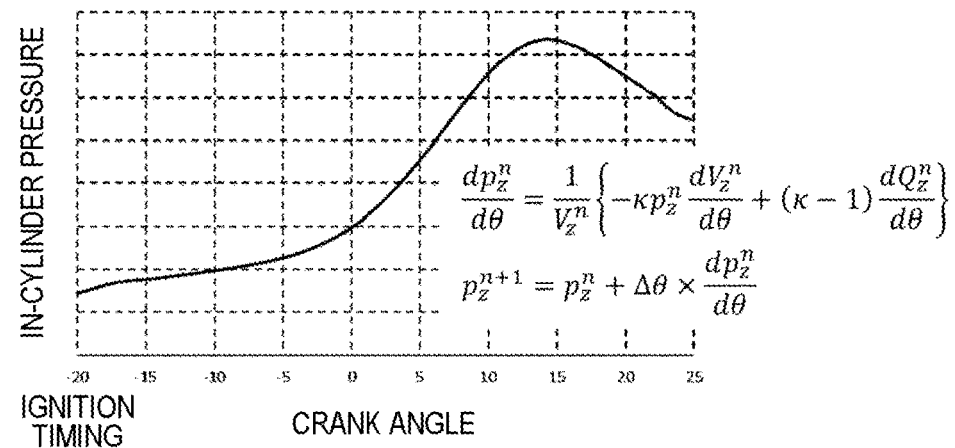
FIG. 11B is a diagram for illustrating a method of operating an in-cylinder pressure.
Figure 11C:
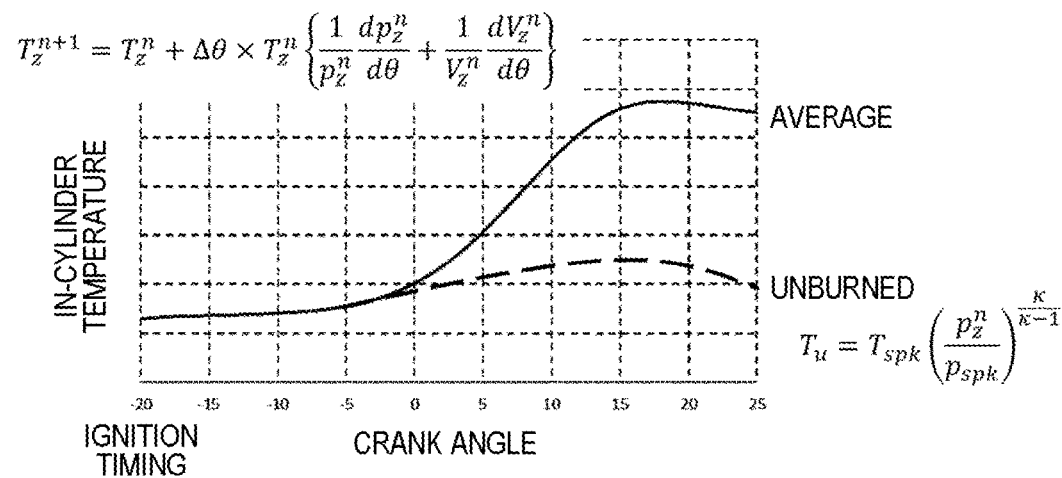
FIG. 11C is a diagram for illustrating a method of operating an in-cylinder temperature and an unburned gas temperature.

FIGS. 11A, 11B, and 11C are diagrams for illustrating method of calculating the in-cylinder pressure, the in-cylinder temperature, and the unburned gas temperature from the heat generation rate associated with combustion. The pressure and the temperature in the cylinder at the timing when the intake valve closes (IVC) are obtained based on the pressure and the temperature of the intake pipe. The pressure and temperature in the cylinder at the ignition timing are obtained by Equations below, assuming a state change from IVC to the ignition timing (SPK) and a polytropic change.

[Math. 11]
$$p_{spk} = p_{ivc}\left(\frac{V_{ivc}}{V_{spk}}\right)^{\kappa} \quad (11)$$

[Math. 12]
$$T_{spk} = T_{ivc}\left(\frac{V_{ivc}}{V_{spk}}\right)^{\kappa-1} \quad (12)$$

Here, $\kappa$ is a polytropic index, and is determined by a specific heat ratio and a heat loss depending on a temperature and a gas composition. Vz is a cylinder volume corresponding to the crank angle. Subsequently, the pressure and the temperature from the ignition timing to the combustion end timing are obtained stepwise by discretizing a differential equation for each crank angle θ and integrating the differential equation. The entire combustion period is divided into N, and the n-th in-cylinder pressure Pz$^n$ is obtained by the following equation based on the volume change rate and the heat generation rate.

[Math. 13]

$$\frac{dp_z^n}{d\theta} = \frac{1}{V_z^n}\left\{-\kappa p_z^n \frac{dV_z^n}{d\theta} + (\kappa - 1)\frac{dQ_z^n}{d\theta}\right\} \quad (13)$$
$$\Rightarrow p_z^{n+1} = p_z^n + \Delta\theta \times \frac{dp_z^n}{d\theta}$$

Furthermore, the n-th in-cylinder temperature Tz$^n$ is obtained by the following equation. Here, θ is the crank angle, and Qz is the calorific value. As dQz/dθ, an experimental formula called Wiebe function can be applied. In addition, a table operation storing a result of calculating the Wiebe function in advance may be used.

[Math. 14]

$$T_z^{n+1} = T_z^n + \Delta\theta \times T_z^n \left\{\frac{1}{p_z^n}\frac{dp_z^n}{d\theta} + \frac{1}{V_z^n}\frac{dV_z^n}{d\theta}\right\} \quad (14)$$

Furthermore, the n-th unburned gas temperature Tu$^n$ is obtained by the following equation based on the pressure and temperature at the ignition timing and the n-th in-cylinder pressure Pz$^n$.

[Math. 15]

$$T_u^n = T_{spk}\left(\frac{p_z^n}{p_{spk}}\right)^{\frac{\kappa}{\kappa-1}} \quad (15)$$

The pressure, temperature, and unburned gas temperature in the entire combustion process are operated by executing Equations (13), (14), and (15) until n=1, 2, ..., and N. There is a trade-off relationship in which the accuracy is improved as the division number N is larger, but the operation load is larger. As the division number N, an optimum value is selected at the time of design from the trade-off relationship. With such a configuration, the cost can be reduced as compared with a configuration including a pressure sensor that directly detects the pressure of the cylinder.

Figure 12A:
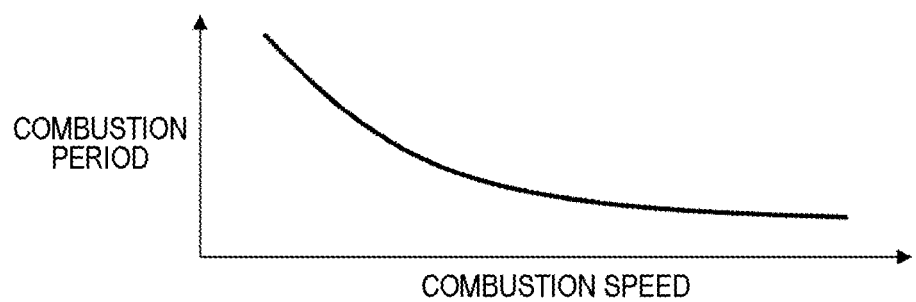
FIG. 12A is a diagram for illustrating a relationship between a combustion speed and a combustion period.
Figure 12B:
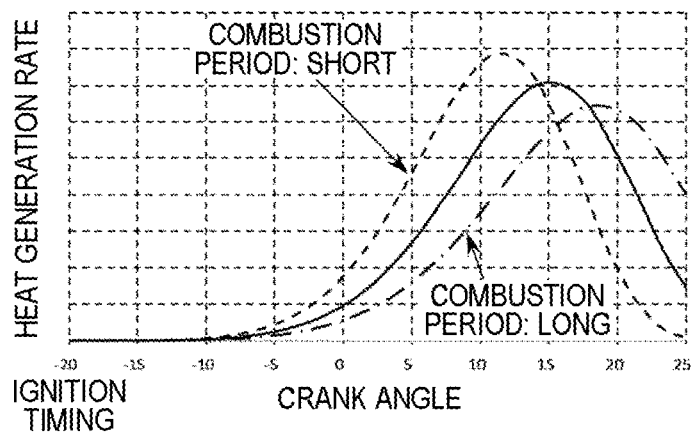
FIG. 12B is a diagram for illustrating the influence of the difference in the combustion period on the heat generation rate.
Figure 12C:
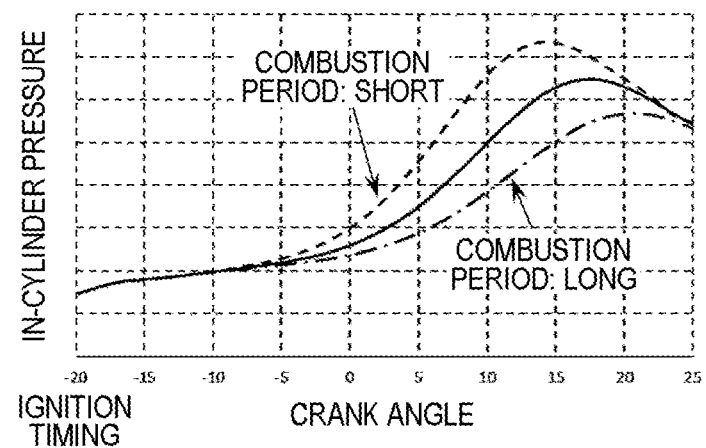
FIG. 12C is a diagram for illustrating the influence of the difference in the combustion period on the in-cylinder pressure.
Figure 12D:
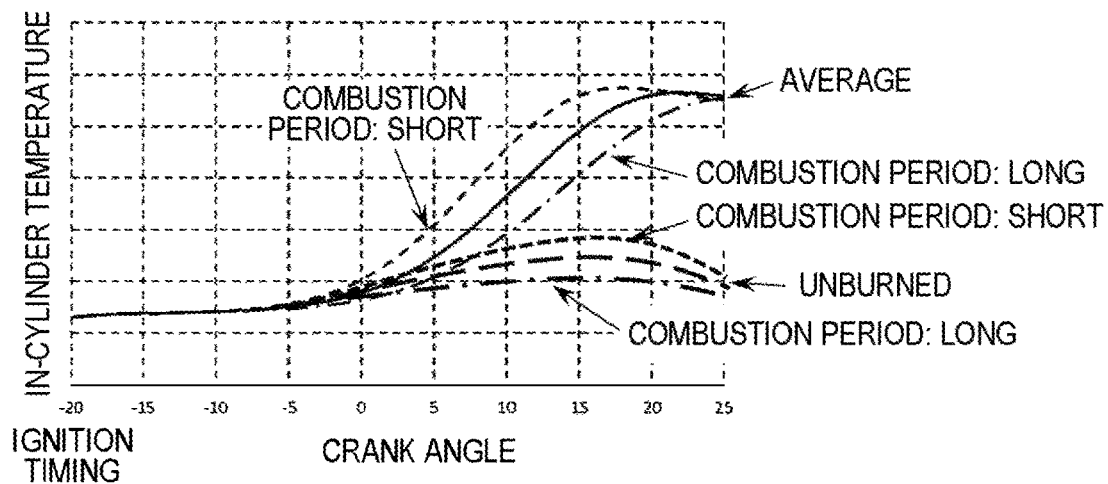
FIG. 12D is a diagram for illustrating the influence of the difference in the combustion period on the temperature.

FIGS. 12A to 12D are diagrams for illustrating the relationship between the combustion speed and the combustion period and the influence of the difference in the combustion period on the in-cylinder pressure and the temperature. As illustrated in FIG. 12A, the relationship between the combustion speed and the combustion period is substantially inversely proportional, and the combustion period increases as the combustion speed decreases. As to the influence of the combustion period on the in-cylinder pressure, the shorter the combustion period, the more the in-cylinder pressure changes on the increase side. In addition, the in-cylinder pressure temperature and the unburned gas temperature also shift on the increase side as the combustion period decreases.

As described above, since the in-cylinder pressure and the temperature are affected by the change in the combustion speed and the combustion speed itself is also affected by the pressure and the temperature, it is difficult in principle to predict the combustion speed and the combustion period of the cycle in advance at the combustion start time point. Therefore, in order to control the EGR rate, the air-fuel ratio, and the ignition timing based on the combustion speed and the combustion period, means for predicting the combustion speed and the combustion period is required. As the prediction means, the system according to the embodiment of the present invention includes learning means of the combustion speed and the combustion period, and is configured to perform current or future prediction based on a past learning result.

Figure 13A:
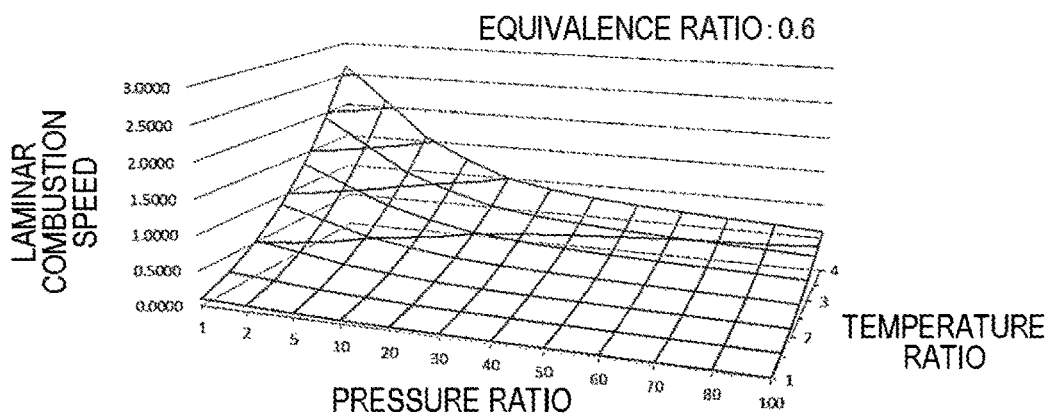
FIG. 13A is a diagram for illustrating the influence of pressure, an unburned gas temperature, and an equivalence ratio (0.6) on the laminar flow combustion speed of gasoline.
Figure 13B:
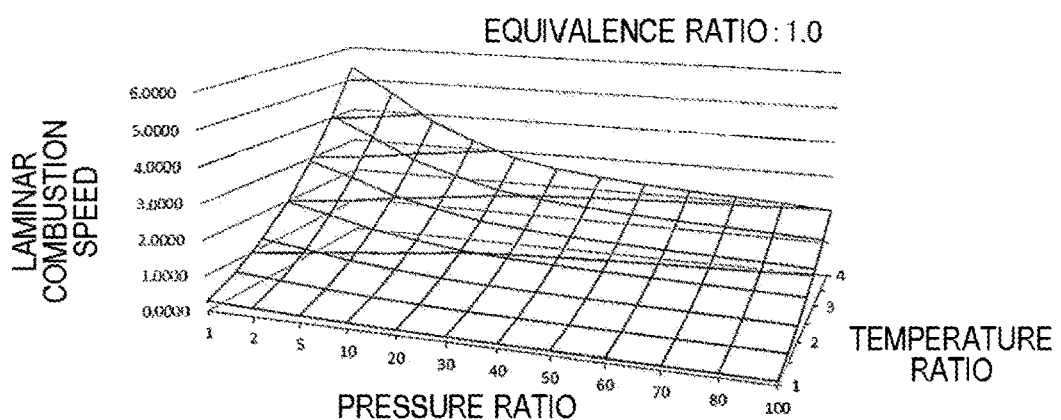
FIG. 13B is a diagram for illustrating the influence of pressure, an unburned gas temperature, and an equivalence ratio (1.0) on the laminar flow combustion speed of gasoline.
Figure 13C:
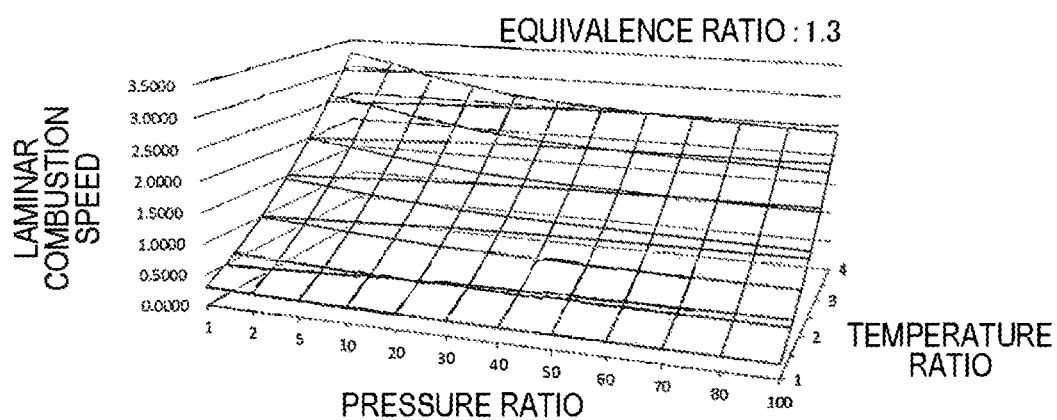
FIG. 13C is a diagram for illustrating the influence of pressure, an unburned gas temperature, and an equivalence ratio (1.3) on the laminar flow combustion speed of gasoline.

FIGS. 13A, 13B, and 13C are diagrams for illustrating the influence of pressure, an unburned gas temperature, and an equivalence ratio on the laminar flow combustion speed of gasoline. The pressure ratio and the temperature ratio are ratios to the atmospheric pressure and the atmospheric temperature in the standard state. Both the pressure, the unburned gas temperature and the equivalence ratio have an influence on the laminar flow combustion rate, and their sensitivity changes under the influence of the interaction. By providing this relationship in the laminar flow combustion speed operation unit 704 in FIG. 7 as a map or a function, the laminar flow combustion speed is obtained based on the pressure, the unburned gas temperature, and the equivalence ratio.

Figure 14:
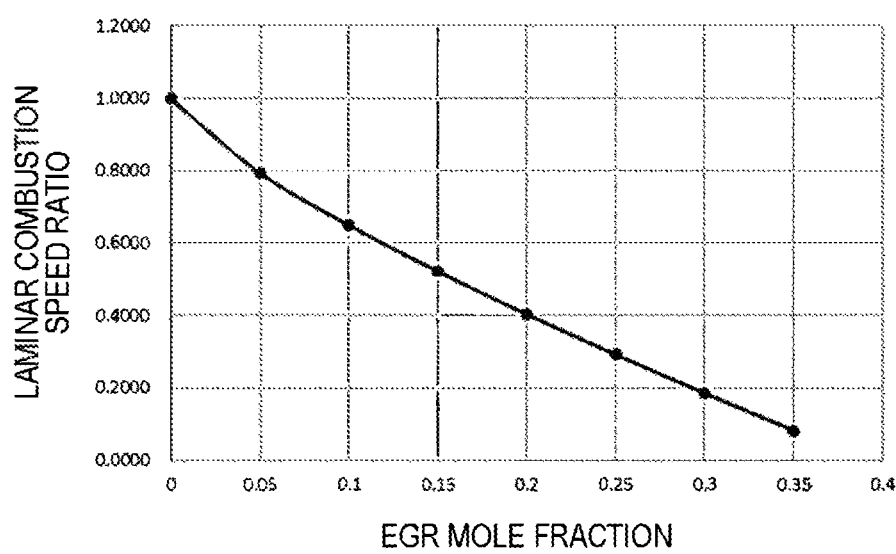
FIG. 14 is a diagram for illustrating the influence of the EGR rate on the laminar flow combustion speed of gasoline.

FIG. 14 is a diagram for illustrating the influence of the EGR rate on the laminar flow combustion speed of gasoline. In the drawing, the vertical axis represents a laminar flow combustion speed ratio based on a condition of the EGR route of 0 as a reference 1.0, and represents sensitivity to an EGR mole fraction. As the EGR rate increases, the laminar flow combustion rate decreases. This relationship is provided in the laminar flow combustion speed operation unit 704 in FIG. 7 as a table or a function, whereby the laminar flow combustion speed is obtained based on the EGR rate.

FIG. 15 is a diagram for illustrating a method of learning the relationship between the combustion speed and the combustion period. Here, a method of learning by approximating the above-described relationship with a polynomial is adopted. Since the combustion speed is affected by turbulence in addition to the laminar flow combustion speed, the rotation speed and the charging efficiency are considered when learning the relationship between the combustion speed and the combustion period. Furthermore, since the combustion mechanism is different between the initial combustion period (ignition timing to MFB 10) and the main combustion period (MFB 10 to MFB 90), the laminar flow combustion speed in both periods is considered. The following polynomial having these as variables is defined.

[Math. 16]

$$y = b_0 + b_1 x_1 + b_2 x_1^2 + b_3 x_2 + b_4 x_2^2 + b_5 x_3 + b_6 x_3^2 + b_7 x_4 + \\ b_8 x_4^2 + b_9 x_1 x_2 + b_{10} x_1 x_3 + b_{11} x_1 x_4 + b_{12} x_2 x_3 + b_{13} x_2 x_4 \quad (16)$$

Here, y is an output to set the IG 50. $x_1$ is the rotation speed, $x_2$ is the charging efficiency, $x_3$ is the laminar flow combustion speed during the initial combustion period, and $x_4$ is the laminar flow combustion speed during the main combustion period. The above equation can be organized and described by the following partial regression coefficient vector and explanatory variable vector.

[Math. 17]

$$y(k) = \theta^T \varphi(k) \quad (17)$$

$$\varphi(k) = \left[1, x_1, x_1^2, x_2, x_2^2, x_3, x_3^2, x_4, x_4^2, x_1 x_2, x_1 x_3, x_1 x_4, x_2 x_3, x_2 x_4\right]^T$$

$$\theta = [b_0, b_1, b_2, b_3, b_4, b_5, b_6, b_7, b_8, b_9, b_{10}, b_{11}, b_{12}, b_{13}]^T$$

As a result, 13 variables are defined with 4 variables as input elements, and 14 partial regression coefficients including a constant term are identified to learn the relationship between the IG 50 and the combustion speed. This function is included in the combustion speed and combustion period learning unit 707 and the combustion period prediction unit 709 in FIG. 7, so that learning and prediction can be performed. The system according to the example described herein includes a quaternary quadratic polynomial, but the present invention is not limited thereto, and another polynomial may be used. Furthermore, as means to substitute for the polynomial, a neural network, a control map, and the like also exhibit effects similar to or close to the learning and prediction functions by the polynomial.

Figure 16:
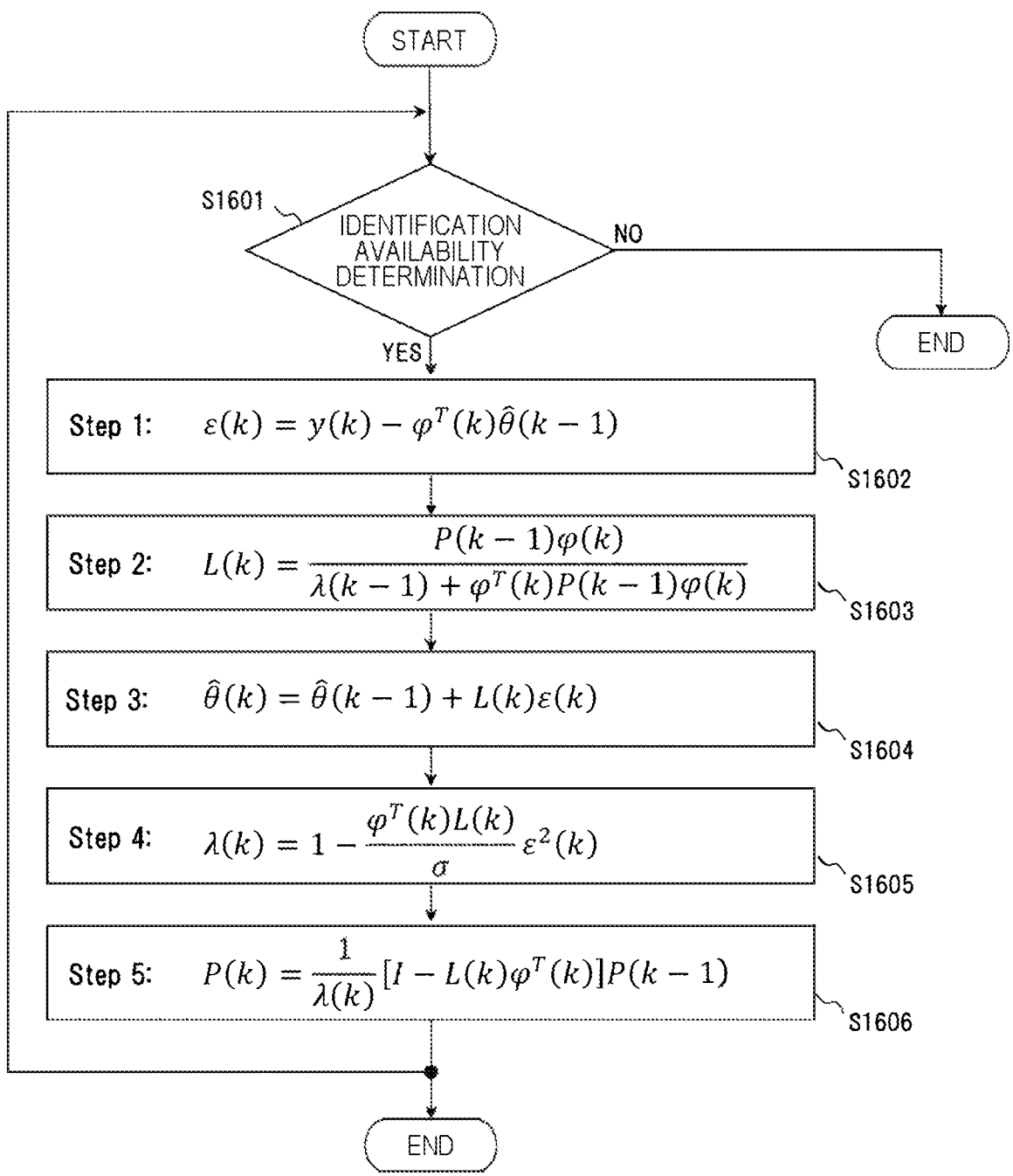
FIG. 16 is a diagram for illustrating a method of learning the relationship between the combustion speed and the combustion period based on a successive least squares algorithm and a flowchart thereof.

FIG. 16 is a diagram for illustrating a method of learning the relationship between the combustion speed and the combustion period based on a successive least squares algorithm and a flowchart thereof. A method for sequentially updating the partial regression coefficient vector θ^ based on the relationship between the input and the output will be described. Note that the partial regression coefficient vector is represented by adding a symbol ^ on θ (or upper right). When the sequential least squares algorithm is executed, whether the sequential least squares algorithm can be executed is determined in S1601. The sensor state and the prediction range of the underlying state equation are considered as the determination index of the execution feasibility. Hereinafter, operation equations executed in S1602 to S1606 will be specifically described.

Here, the relationship between the combustion period and the combustion speed as a target is a time-varying system affected by a fuel property, deposition, and an actuator sensor error, and in order to cope with this, a sequential identification algorithm including a variable forgetting element is adopted. The forgetting element is a function of exponentially reducing the influence of the past data, and by further making the past data variable forgetting, the past data can be actively used by bringing the forgetting element close to 1 in the steady state while forgetting the past data in the transient state. Hereinafter, a successive least squares algorithm with a variable forgetting element is shown. First, a difference between the polynomial and the output value is obtained as an error ϵ (k) by the following equation (S1602).

[Math. 18]

$$\epsilon(k) = y(k) - \varphi^T(k)\hat{\theta}(k-1) \quad (18)$$

Next, L(k) is obtained by the following equation from a covariance matrix P(k−1), an input vector φ(k), and a forgetting element λ(k), and a partial regression coefficient vector θ^(k) is updated by the following equation based on the obtained value and the error ϵ(k) (S1603, S1604).

[Math. 19]

$$L(k) = \frac{P(k-1)\varphi(k)}{\lambda(k-1) + \varphi^T(k)P(k-1)\varphi(k)} \quad (19)$$

$$\hat{\theta}(k) = \hat{\theta}(k-1) + L(k)\varepsilon(k)$$

At this time, the forgetting element λ(k) and a covariance matrix P (k) are obtained by the following equations (S1605, S1606).

[Math. 20]

$$\lambda(k) = 1 - \frac{\varphi^T(k)L(k)}{\sigma}\varepsilon^2(k) \quad (20)$$

$$P(k) = \frac{1}{\lambda(k)}\left[I - L(k)\varphi^T(k)\right]P(k-1)$$

Here, σ is an adjustment parameter at the time of learning. Note that, although the successive least squares algorithm is adopted as the parameter identification algorithm of the present embodiment, the present invention is not limited thereto. That is, even when another optimization method such as a genetic algorithm is applied as the parameter identification algorithm, a similar or similar effect is obtained.

Figure 17:
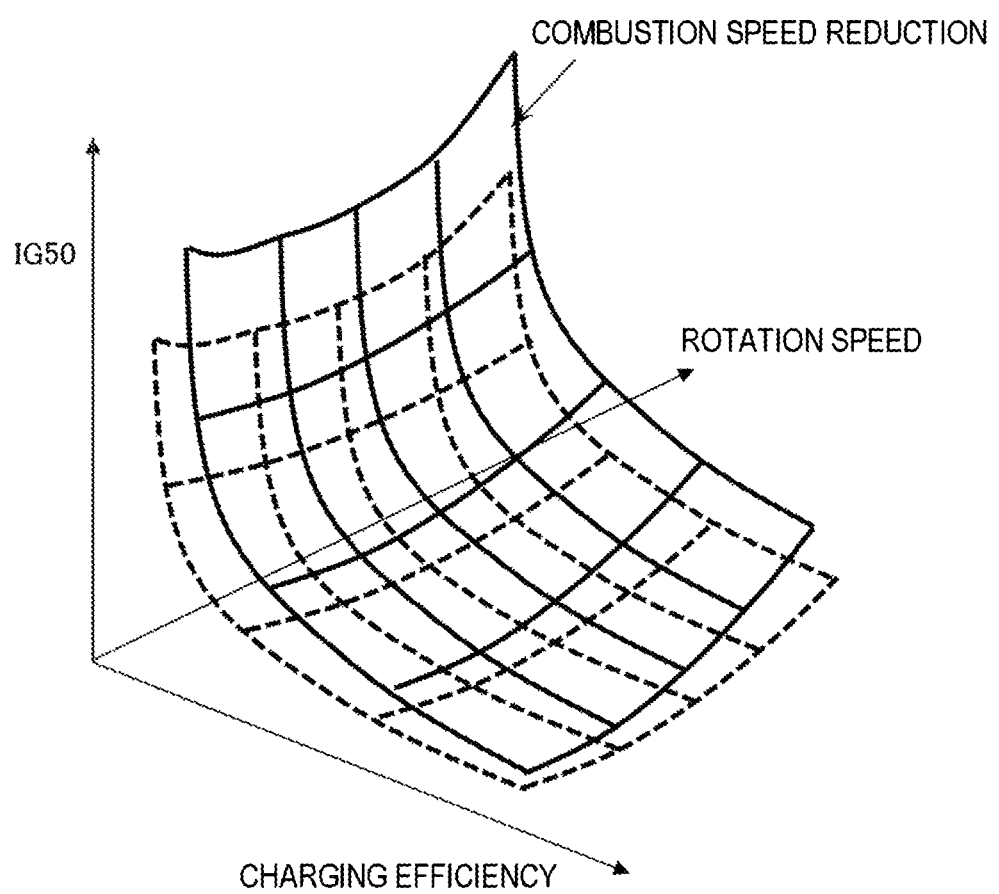
FIG. 17 is a diagram for illustrating a tendency of the IG 50 with respect to a rotation speed and charging efficiency.

FIG. 17 is a diagram for illustrating a tendency of the IG 50 with respect to a rotation speed and charging efficiency. In the IG 50, the laminar flow combustion speed mainly in the initial combustion period decreases under the influence of an increase in the residual gas ratio and a decrease in the pressure and temperature conditions under a low load condition in which the charging efficiency decreases, so that the IG 50 tends to increase. On the other hand, with respect to the rotation speed, since the turbulent intensity increases as the rotation speed increases and the turbulent flow combustion speed also increases, the influence on the combustion period tends to be relatively small even if the laminar flow combustion speed does not increase.

The tendency of the IG 50 with respect to the rotation speed and the charging efficiency described above is approximated by Equation (16). In a case where the EGR changes to the increase side with respect to the same EGR valve opening degree due to the influence of the depot in the EGR combustion, the IG 50 changes to the increase side. In addition, also in the lean burn, in a case where the laminar flow combustion speed changes to the side where the laminar flow combustion speed decreases with respect to the same target equivalence ratio due to the influence of the fuel property and the fuel type, the IG 50 changes to the increase side. Even for such a change for each engine, adaptive control by on-board learning can be performed by adopting Equation (16) and the successive least squares approximation of the partial regression coefficient of the model.

Figure 18:
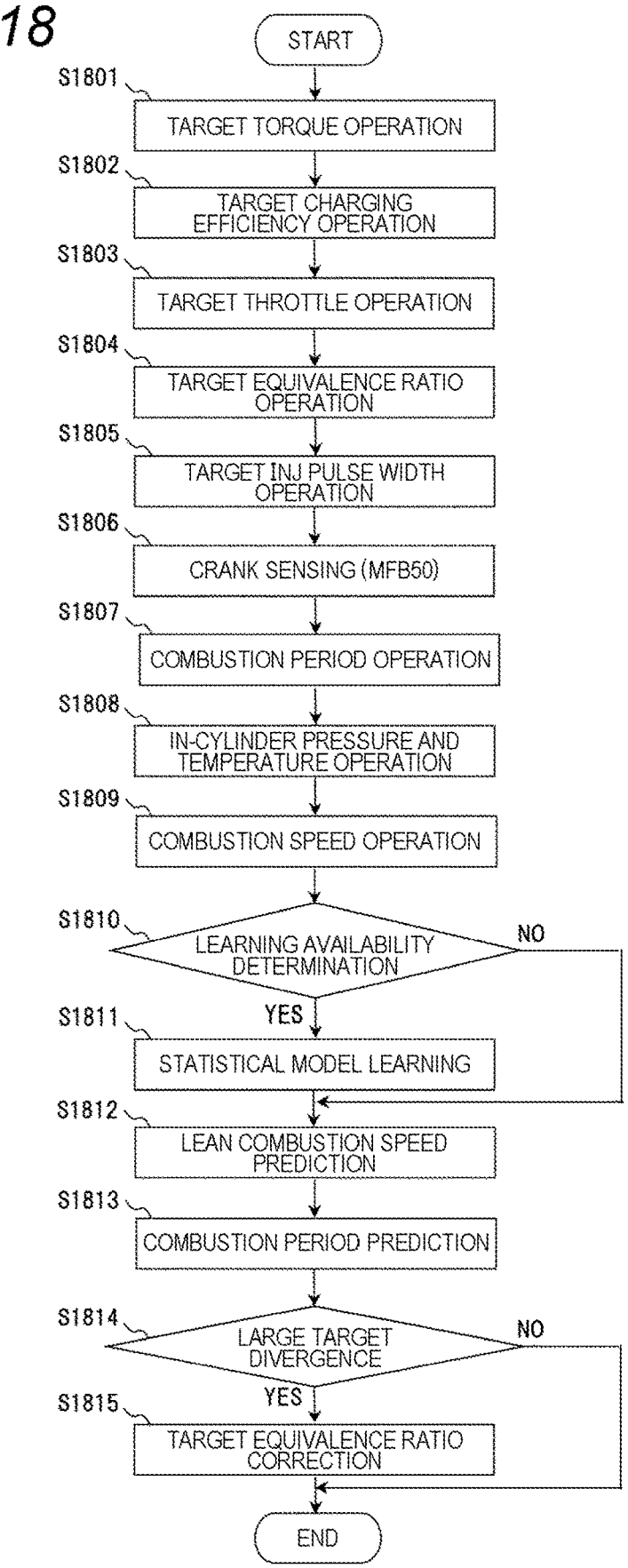
FIG. 18 is a flowchart for illustrating a combustion control method using combustion detection information based on a crank angle sensor in a lean-burn system.

FIG. 18 is a flowchart for illustrating a combustion control method using combustion detection information based on the crank angle sensor in a lean-burn system. In S1801, the target torque is operated based on the accelerator pedal depression amount of the driver. In S1802, the charging efficiency for realizing the target torque is operated. In S1803, a throttle valve opening degree for realizing the air amount required for the engine is operated.

In S1804, the target equivalence ratio is operated based on the rotation speed and the charging efficiency. In S1805, an injector fuel injection pulse width for realizing the target equivalence ratio is operated. In S1806, the MFB 50 is detected based on the crank angle sensor signal. In S1807, each combustion period such as the initial combustion period, the main combustion period, and the entire combustion period is operated from the MFB 50 and the ignition timing.

In S1808, the in-cylinder pressure, the temperature, and the unburned gas temperature with respect to the crank angle are operated in consideration of the heat generation rate profile and the combustion chamber volume change rate determined from the entire combustion period. In S1809, the laminar flow combustion speed in each period is operated based on the in-cylinder pressure, the unburned gas temperature, the EGR rate, and the equivalence ratio corresponding to the initial combustion period and the main combustion period described above.

In S1810, it is determined whether learning is possible in consideration of the steady state, the sensor operation condition, or the like, and when it is determined that learning is possible, a statistical model regarding the combustion speed and the combustion period is learned in S1811. In S1812, the combustion speed at the target equivalence ratio (lean, in the example of FIG. 18) is predicted. In S1813, the combustion period is predicted using the statistical model based on the predicted combustion speed. In S1814, in a case where the combustion period becomes a value larger than the predetermined value based on the predicted combustion period, the equivalence ratio is corrected to a higher value in S1815.

By performing the control as described above, it is possible to appropriately prevent combustion instability due to an excessive combustion period in lean burn.

Figure 19:
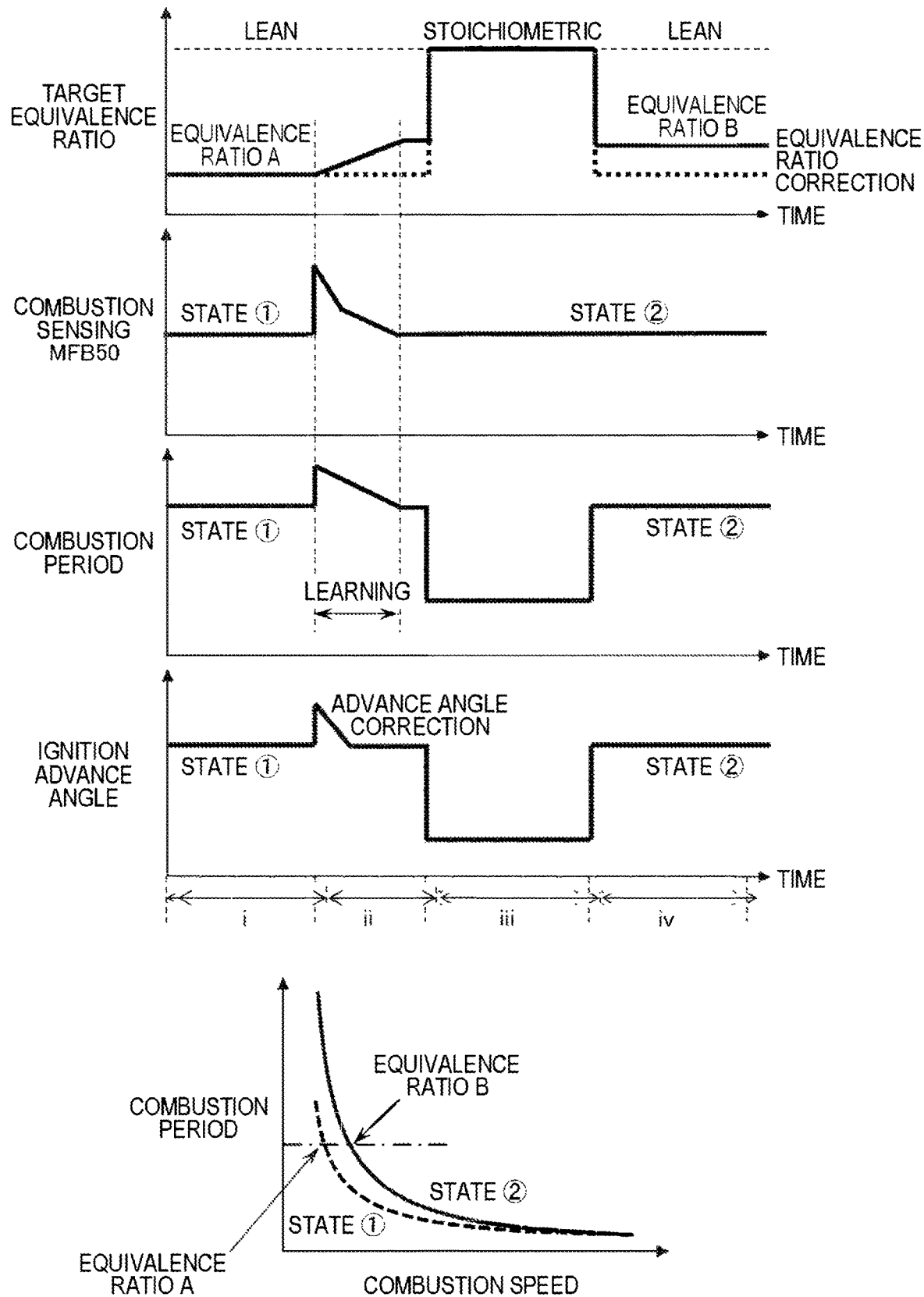
FIG. 19 is a time chart for illustrating a behavior when combustion control using combustion detection information based on a crank angle sensor is executed in the lean-burn system.

FIG. 19 is a time chart for illustrating a behavior when combustion control using combustion detection information based on the crank angle sensor is executed in the lean-burn system. When the MFB 50 is retarded and the combustion period becomes larger than the predetermined value under the lean condition (time: ii), the MFB 50 is corrected to a desired timing by once advancing the ignition timing. Furthermore, the equivalence ratio is corrected to a higher value to increase the combustion speed so that the combustion period becomes a predetermined value.

The relationship between the combustion period and the combustion speed at this time is learned. After completion of the learning, the combustion speed with respect to the target equivalence ratio is predicted, the combustion period with respect to the predicted combustion speed is predicted, and the target equivalence ratio is corrected so that the predicted combustion period becomes a predetermined value (equivalence ratio A→B). In the next lean-burn combustion mode (time: iv), by using the corrected equivalence ratio as a new target equivalence ratio, it is possible to appropriately prevent combustion instability and implement lean burn.

Figure 20:
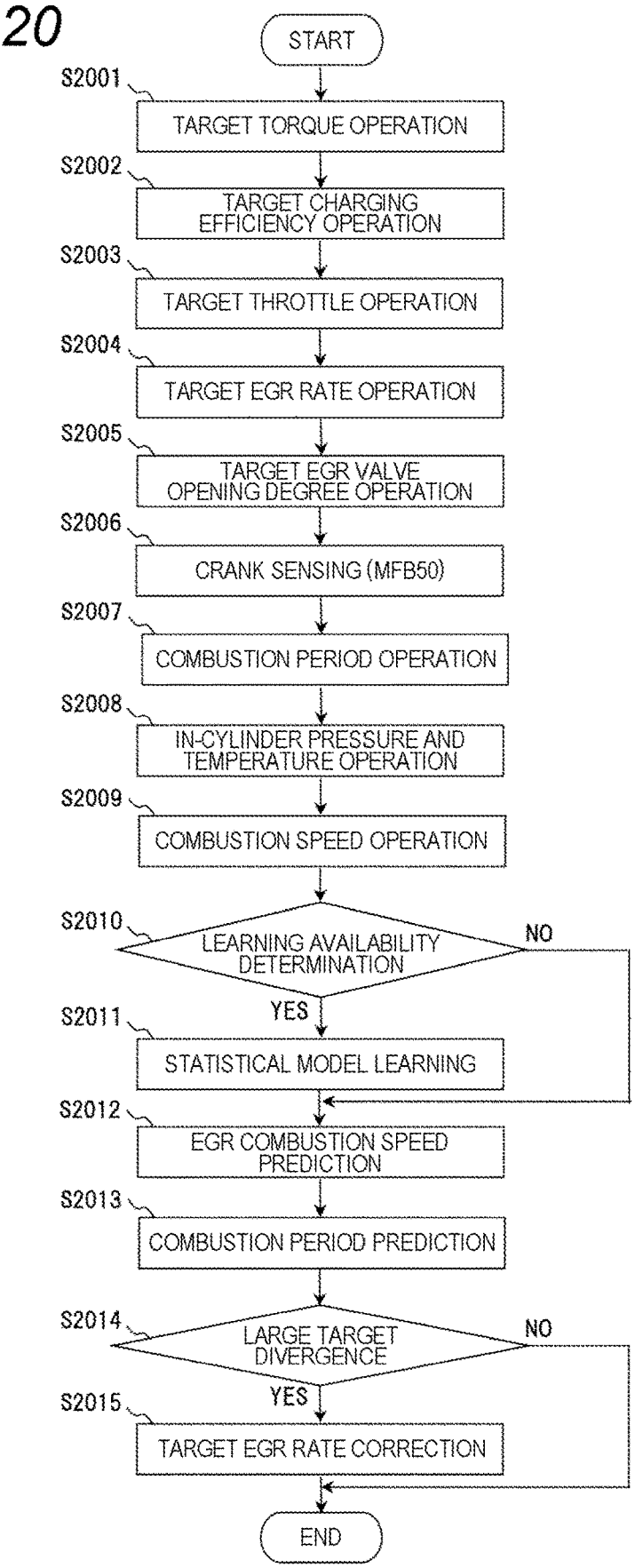
FIG. 20 is a flowchart for illustrating a combustion control method using combustion detection information based on a crank angle sensor in an EGR system.

FIG. 20 is a flowchart for illustrating a combustion control method using combustion detection information based on the crank angle sensor in the EGR system. In S2001, the target torque is operated based on the accelerator pedal depression amount of the driver. In S2002, the charging efficiency for realizing the target torque is operated. In S2003, a throttle valve opening degree for realizing the air amount required for the engine is operated.

In S2004, the target EGR rate is operated based on the rotation speed and the charging efficiency. In S2005, the EGR valve opening degree for realizing the target equivalence ratio is operated. In S2006, the MFB 50 is detected based on the crank angle sensor signal. In S2007, each combustion period such as the initial combustion period, the main combustion period, and the entire combustion period is operated from the MFB 50 and the ignition timing.

In S2008, the in-cylinder pressure, the temperature, and the unburned gas temperature with respect to the crank angle are operated in consideration of the heat generation rate profile and the combustion chamber volume change rate determined from the entire combustion period. In S2009, the laminar flow combustion speed in each period is operated based on the in-cylinder pressure, the unburned gas temperature, the EGR rate, and the equivalence ratio corresponding to the initial combustion period and the main combustion period described above.

In S2010, it is determined whether learning is possible in consideration of the steady state, the sensor operation condition, or the like, and when it is determined that learning is possible, a statistical model regarding the combustion speed and the combustion period is learned in S2011. In S2012, the combustion speed at the target EGR rate is predicted. In S2013, the combustion period is predicted using the statistical model based on the predicted combustion speed. In S2014, in a case where the combustion period becomes a value larger than the predetermined value based on the predicted combustion period, the EGR rate is corrected to be decreased in S2015.

By performing the above control, it is possible to appropriately prevent combustion instability caused by an excessive combustion period in the EGR combustion.

FIG. 21 is a time chart for illustrating a behavior when combustion control using combustion detection information based on a crank angle sensor is executed in the EGR combustion system. When the MFB 50 is retarded and the combustion period becomes larger than the predetermined value under the EGR condition (time: ii), the MFB 50 is corrected to a desired timing by once advancing the ignition timing. Furthermore, the EGR rate is corrected to be decreased to increase the combustion speed so that the combustion period becomes a predetermined value.

The relationship between the combustion period and the combustion speed at this time is learned. After completion of the learning, the combustion speed with respect to the target EGR rate is predicted, the combustion period with respect to the predicted combustion speed is predicted, and the target EGR rate is corrected so that the predicted combustion period becomes a predetermined value (EGR rate A, B). In the next EGR combustion mode (time: iv), by using the corrected EGR rate as a new target EGR rate, it is possible to appropriately prevent combustion instability and implement EGR rate.

As described above, the electronic control unit (ECU 21) according to the present embodiment is an electronic control unit that controls an engine including an EGR system including an EGR pipe (EGR pipe 15) that recirculates a part of exhaust gas from an internal combustion engine to an intake pipe and an EGR valve (EGR valve 19) disposed in the EGR pipe, an air flow sensor (air flow sensor 3) that detects a flow amount of air taken into the intake pipe, a throttle valve (throttle valve 4) provided on a downstream side of the air flow sensor, an intake pipe pressure sensor (intake pipe pressure sensor 6) that is provided on a downstream side of the throttle valve and on a downstream side of a connection portion between the intake pipe and the EGR pipe and detects an intake pipe pressure that is a pressure on a downstream side of the throttle valve in the intake pipe, and a crank angle sensor that detects a rotation speed, a combustion centroid timing (MFB 50), and the like.

The electronic control unit (ECU 21) includes means for calculating the in-cylinder pressure, the temperature, and the unburned gas temperature based on the combustion period operated based on the MFB 50 detected by the crank angle sensor, calculating the combustion speed based on the equivalence ratio and the EGR rate, learning the correlation between the combustion period and the combustion speed, and correcting the EGR rate and the target value of the equivalence ratio based on the learned correlation.

Furthermore, in the present embodiment, a sequential least squares algorithm is applied to at least the learning unit. According to the present embodiment configured as described above, when the EGR combustion or lean burn is executed, in a case where the combustion speed is excessively decreased and combustion instability occurs due to an increase in the combustion period, it is possible to appropriately detect this and control the EGR rate and the equivalence ratio for making the combustion speed more appropriate. Therefore, combustion stabilization can be realized, and the thermal efficiency of the engine can be improved.

In addition, the present invention is not limited to the above-described embodiments, and it goes without saying that various other application examples and modifications can be taken without departing from the gist of the present invention described in the claims. For example, the above-described embodiments describe the configurations of the electronic control device and the engine control system in detail and specifically in order to describe the present invention in an easy-to-understand manner, and are not necessarily limited to those including all the components described above. In addition, it is also possible to add, replace, or delete other components for a part of the configuration of the above-described embodiment.

In the above-described embodiment, an example in which the present invention is applied to an engine system without a supercharger has been described, but the present invention is not limited to this example. For example, if a control model of an engine system including a supercharger is created, the present invention can be applied to an engine system including a supercharger.

In addition, some or all of the configurations, functions, processing units, and the like of the above-described embodiments may be realized by hardware, for example, by designing with an integrated circuit. A field programmable gate array (FPGA), an application specific integrated circuit (ASIC), or the like may be used as the hardware.

Furthermore, in the flowcharts illustrated in FIGS. 18 and 20, a plurality of procedures of processing may be executed in parallel or the processing order may be changed within a range not affecting the processing result.

Main features of the present embodiment can also be summarized as follows.

A processor (B705, B706, FIG. 7) of the control device (ECU 21, FIG. 2) for the internal combustion engine 1 operates a first combustion timing (MFB 50) or a first combustion period (IG 100_1) in a cylinder of the internal combustion engine 1 from a crank angle detected by the crank angle sensor 20. In the present embodiment, the processor operates the first combustion period (IG 100_1) after calculating the first combustion timing (MFB 50), but may directly operate one or both of them according to a learning target.

A processor (B702) operates a heat generation rate based on the first combustion timing (MFB 50) or the first combustion period (IG 100_1). A processor (B703) operates in-cylinder pressure and in-cylinder unburned gas temperature based on the heat generation rate. A processor (B704) operates a first combustion speed (laminar flow combustion speed SL1) based on the in-cylinder pressure and the in-cylinder unburned gas temperature. As a result, the combustion state (in-cylinder pressure, in-cylinder unburned gas temperature, combustion speed) in the cylinder can be detected without using the in-cylinder sensor, and the manufacturing cost can be reduced. In addition, the operation load of the in-cylinder pressure can be reduced as compared with the conventional example (method of calculating the in-cylinder pressure from the dynamic relationship of the crank mechanism).

A processor (B707) learns a correspondence relationship between the first combustion speed (laminar flow combustion speed SL1) and the first combustion period (IG 100_1). In the present embodiment, the processor (B707) learns the correspondence relationship between the first combustion speed (laminar flow combustion speed SL1) and the first combustion period (IG 100_1), but may learn the correspondence relationship between the first combustion speed (laminar flow combustion speed SL1) and the first combustion timing (MFB 50). As a result, it is possible to adapt to variations in the correspondence relationship caused by the use environment (fuel, in-vehicle equipment, sensor, actuator, or the like) unique to the vehicle.

A processor (B708, FIG. 7) predicts the second combustion speed (laminar flow combustion speed SL2) in a state where the control parameter becomes a target value based on the target value (target equivalence ratio and target EGR rate) of the control parameter of the feedback control of the internal combustion engine 1. As a result, the combustion speed (laminar flow combustion speed SL2) in a state in which the control parameter becomes the target value can be acquired.

A processor (B709, B710) corrects a target value (target equivalence ratio and target EGR rate) of the control parameter of the internal combustion engine based on the predicted second combustion speed (laminar flow combustion speed SL2). Thus, the feedback control can be performed without using the in-cylinder sensor.

Specifically, the processor (B709) predicts the second combustion period (IG 100_2) corresponding to the second combustion speed (laminar flow combustion speed SL2) from the learned correspondence relationship. The processor (B709) may predict the second combustion timing corresponding to the second combustion speed (laminar flow combustion speed SL2) instead of predicting the second combustion period (IG 100_2). As a result, it is possible to acquire the combustion period (IG 100_2) or the combustion timing in a state where the control parameter becomes the target value in the use environment for each vehicle.

The processor (B710) corrects the target value of the control parameter (target equivalence ratio and target EGR rate) of the internal combustion engine 1 based on the second combustion period (IG 100_2). The processor (B710) may correct the target value (target equivalence ratio and target EGR rate) of the control parameter of the internal combustion engine 1 based on the predicted second combustion timing. Thus, the feedback control can be performed without using the in-cylinder sensor.

The control parameter is, for example, an EGR rate, an EGR valve opening degree, an air-fuel ratio, a fuel injection period indicating a drive pulse width of an injector, an ignition timing, ignition energy, or an opening degree of a flow enhancing valve that generates a drift in intake air. This makes it possible to prevent combustion failure of the internal combustion engine. The ignition energy is controlled, for example, by changing the energization time to the ignition plug.

The processor (B707) may stop learning of the correspondence relationship according to the operating state of the internal combustion engine 1 or the operating state of the actuator or the sensor mounted on the internal combustion engine 1. For example, immediately after the start of the ECU 21, learning of the correspondence is stopped in a state where the detection value of the sensor is moving around or the like. This improves the accuracy of learning.

(Modification)

The processor may compare the first combustion speed (laminar flow combustion speed SL1), the first combustion timing (MFB 50), or the first combustion period (IG 100_1) with a threshold value for determining a failure state based on the learning result of the correspondence relationship between the first combustion speed (laminar flow combustion speed SL1) and the first combustion timing or the first combustion period (IG 100_1), and diagnose the failure based on the comparison result. As a result, the failure can be determined without using the in-cylinder sensor.

Furthermore, the processor may predict the period until reaching the failure state based on the temporal change in the learning result of the correspondence relationship and the threshold value for determining the failure state. As a result, for example, the user can perform maintenance of the internal combustion engine or the control device in consideration of the period until reaching the predicted failure state.

Embodiments of the present invention may have the following aspects.

(1) A control device (ECU 21) for an internal combustion engine 1 including a crank angle sensor 20 that detects a crank angle on a crankshaft of the internal combustion engine 1 and means for detecting a combustion timing (MFB 50) in a cylinder based on a crank angle sensor detection value, the control device including: means (B703) for calculating in-cylinder pressure and in-cylinder unburned gas temperature based on information on the combustion timing, means (B704) for calculating a combustion speed based on the operated in-cylinder pressure and the in-cylinder unburned gas temperature, and means (B707) for learning a relationship between the operated combustion speed and the detected combustion timing or combustion period.

(2) The control device for the internal combustion engine according to (1), further including means (B708) for predicting the combustion speed based on a target value (target equivalence ratio, target EGR rate, or the like) of a control parameter of the internal combustion engine.

(3) The control device for the internal combustion engine according to (2), further including means (B710) for correcting a target value of a control parameter of the internal combustion engine based on the predicted combustion speed.

(4) The control device for the internal combustion engine according to (1), further including means (B708, B709) for predicting the combustion speed based on a target value of a control parameter of the internal combustion engine, and predicting the combustion timing or the combustion period based on the predicted combustion speed from a learning result of a relationship between the combustion speed and the combustion timing or the combustion period.

(5) The control device for the internal combustion engine according to (4), further including means (B710) for correcting a target value of a control parameter of the internal combustion engine based on the predicted combustion timing or combustion period.

(6) The control device for the internal combustion engine according to any one of (3) to (5), in which the control parameter is an EGR rate or an EGR valve opening degree.

(7) The control device for the internal combustion engine according to any one of (3) to (5), in which the control parameter is an air-fuel ratio or an injector injection period.

(8) The control device for the internal combustion engine according to any one of (3) to (5), in which the control parameter is ignition timing or ignition energy.

(9) The control device for the internal combustion engine according to any one of (3) to (5), in which the control parameter is an opening degree of a flow enhancing valve.

(10) The control device for the internal combustion engine according to (1), further including means for stopping learning means of a relationship between the combustion speed and the combustion timing or the combustion period based on an operation state of the internal combustion engine 1 or an operation state of an actuator or a sensor mounted on the internal combustion engine 1.

(11) The control device for the internal combustion engine according to (1), further including abnormality diagnosis means for comparing the combustion speed, the combustion timing, or the combustion period with a threshold for determining an abnormal state based on a learning result of a relationship between the combustion speed and the combustion timing or the combustion period, and diagnosing an abnormality based on a comparison result.

(12) The control device for the internal combustion engine according to (1), further including abnormality diagnosis means for predicting a period until the learned value reaches an abnormal state based on a temporal change of the learning result and a threshold for determining an abnormal state based on a learning result of a relationship between the combustion speed and the combustion timing or the combustion period.

According to at least one aspect described above, the relationship between the in-cylinder combustion speed and the combustion period is learned based on the combustion centroid timing detected based on the crank angle sensor, and the EGR control or the air-fuel ratio control is corrected based on the relationship. As a result, the EGR control accuracy and the air-fuel ratio control accuracy can be kept high, and the combustion failure (for example, combustion instability and misfire) of the internal combustion engine due to the EGR control and the air-fuel ratio control error can be appropriately prevented.

REFERENCE SIGNS LIST 1 internal combustion engine
3 air flow sensor
4 throttle valve
5 intake manifold
6 intake pipe pressure sensor
12 fuel injection valve
13 ignition plug
15 EGR pipe
17 EGR temperature sensor
18 EGR valve upstream pressure sensor
19 EGR valve 21 ECU
22 warning display lamp
23 control unit
24 storage unit

The invention claimed is:

1. A control device for an internal combustion engine comprising a processor that
  operates a first combustion timing or a first combustion period in a cylinder of an internal combustion engine from a crank angle detected by a crank angle sensor,
  operates a heat generation rate based on the first combustion timing or the first combustion period,
  operates an in-cylinder pressure and an in-cylinder unburned gas temperature based on the heat generation rate,
  operates a first combustion speed based on the in-cylinder pressure and the in-cylinder unburned gas temperature,
  learns a correspondence relationship between the first combustion speed and the first combustion timing or the first combustion period, and
  using the learned correspondence relationship to determine a combustion state of the internal combustion engine, wherein
    the processor compares the first combustion speed, the first combustion timing, or the first combustion period with a threshold value for determining a fault state based on a learning result of the correspondence relationship, and diagnoses a fault based on a comparison result, or
    predicts a period until reaching a fault state based on a temporal change in a learning result of the correspondence relationship and a threshold value for determining the fault state.

2. The control device for the internal combustion engine according to claim 1, wherein
  the processor predicts a second combustion speed in a state where the control parameter reaches a target value based on the target value of the control parameter of the feedback control of the internal combustion engine.

3. The control device for the internal combustion engine according to claim 2, wherein
  the processor corrects the target value of the control parameter of the internal combustion engine based on the predicted second combustion speed.

4. The control device for the internal combustion engine according to claim 2, wherein
  the processor predicts a second combustion timing or a second combustion period corresponding to the second combustion speed from the learned correspondence relationship.

5. The control device for the internal combustion engine according to claim 4, wherein
  the processor corrects the target value of the control parameter of the internal combustion engine based on the second combustion timing or the second combustion period.

6. The control device for the internal combustion engine according to claim 2, wherein
  the control parameter includes
  an EGR rate, an EGR valve opening degree,
  an air-fuel ratio, a fuel injection period indicating a drive pulse width of the injector, an ignition timing, ignition energy, or
  an opening degree of a flow enhancing valve that generates a drift in the intake air.

7. The control device for the internal combustion engine according to claim 1, wherein
  the processor stops learning of the correspondence relationship according to an operating state of the internal combustion engine or an operating state of an actuator or a sensor mounted on the internal combustion engine.

* * * * *